US009231478B2

(12) United States Patent
Sasao et al.

(10) Patent No.: US 9,231,478 B2
(45) Date of Patent: Jan. 5, 2016

(54) STEP-DOWN DIRECT-CURRENT TO DIRECT-CURRENT CONVERTER, CONTROLLER AND CONTROL METHOD THEREOF, AND ELECTRONIC APPARATUS USING SAME

(71) Applicant: Sony Computer Entertainment Inc., Tokyo (JP)

(72) Inventors: Kazuki Sasao, Tokyo (JP); Kazuaki Mitsui, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 83 days.

(21) Appl. No.: 14/314,175

(22) Filed: Jun. 25, 2014

(65) Prior Publication Data
US 2015/0008890 A1    Jan. 8, 2015

(30) Foreign Application Priority Data

Jul. 3, 2013 (JP) .................................. 2013-139485

(51) Int. Cl.
*H02M 3/158* (2006.01)
*H02M 1/084* (2006.01)
*H02M 1/088* (2006.01)
*H02M 1/08* (2006.01)
H02M 1/00 (2007.01)

(52) U.S. Cl.
CPC .............. *H02M 3/1588* (2013.01); *H02M 1/08* (2013.01); *H02M 1/084* (2013.01); *H02M 1/088* (2013.01); *H02M 1/0845* (2013.01); *H02M 3/1584* (2013.01); H02M 2001/0054 (2013.01); H02M 2003/1586 (2013.01)

(58) Field of Classification Search
CPC ... H02M 3/1584; H02M 3/1586; H02M 1/08; H02M 1/084; H02M 1/088; H02M 1/0845
See application file for complete search history.

(56) References Cited

U.S. PATENT DOCUMENTS

| 5,483,436 | A   | * | 1/1996  | Brown    | B60L 9/22   |
|           |     |   |         |          | 323/222     |
| 8,125,200 | B2  | * | 2/2012  | Tsai     | H02M 1/08   |
|           |     |   |         |          | 323/267     |
| 8,836,305 | B2  | * | 9/2014  | Sasao    | G05F 1/46   |
|           |     |   |         |          | 323/282     |
| 9,018,928 | B2  | * | 4/2015  | Dearborn | H02M 3/157  |
|           |     |   |         |          | 323/283     |
| 2006/0113979 | A1 | * | 6/2006 | Ishigaki | H02M 3/1588 |
|           |     |   |         |          | 323/282     |
| 2007/0013350 | A1 | * | 1/2007 | Tang     | H02M 3/1584 |
|           |     |   |         |          | 323/237     |
| 2008/0238392 | A1 | * | 10/2008 | Cheung  | H02M 3/1584 |
|           |     |   |         |          | 323/283     |

* cited by examiner

Primary Examiner — Timothy J Dole
Assistant Examiner — Ishrat Jamali
(74) Attorney, Agent, or Firm — Matthew B. Dernier, Esq.

(57) ABSTRACT

An M-channel (M is an integer of at least two) synchronous rectification type step-down DC/DC converter is provided. A controller in the converter (i) calculates a load current on a basis of currents flowing through M inductors, (ii) dynamically changes the number K of driving phases (K is an integer of up to M) on the basis of the calculated load current, (iii) generates a pulse signal adjusted in duty ratio such that an output voltage of an output line coincides with a predetermined reference voltage, (iv) selects K drivers among M drivers, and distributes the pulse signal with a phase difference of (360/K) degrees to each of the selected K drivers, and (v) monotonically increases an amplitude control signal indicating the amplitude of a gate driving voltage with respect to the calculated load current in a range determined in advance for each number K of driving phases.

17 Claims, 13 Drawing Sheets

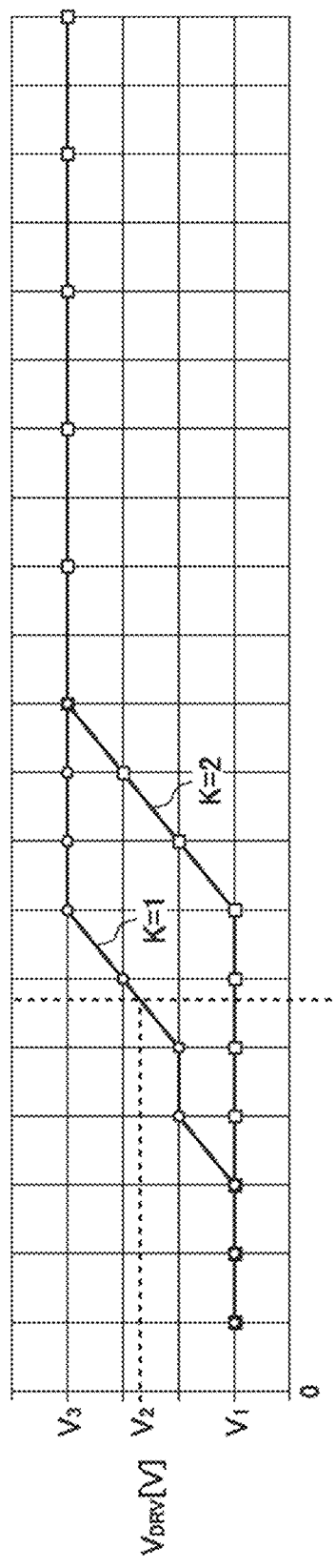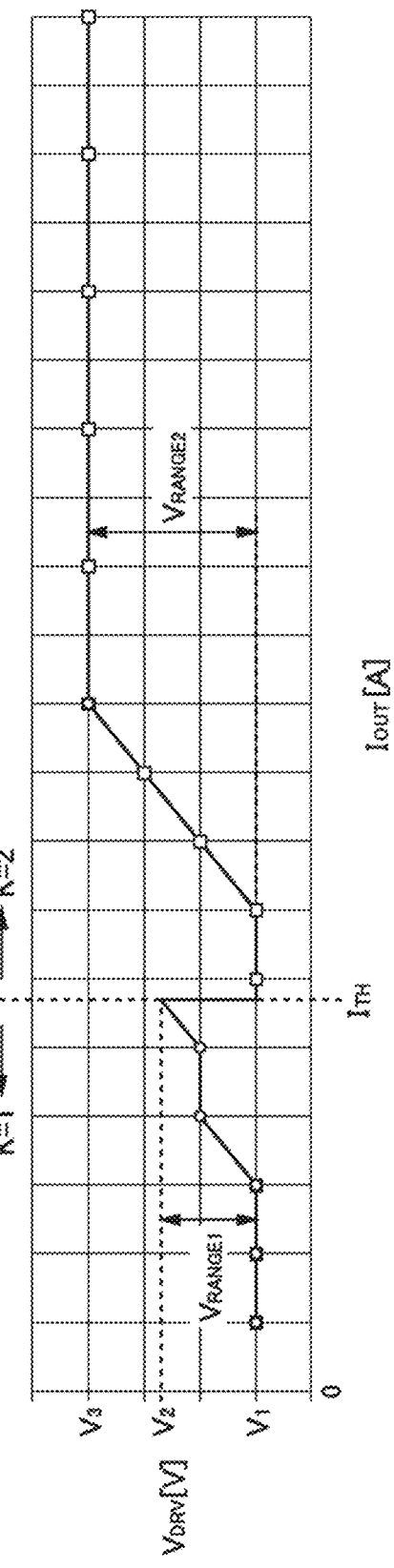

STEP-DOWN DIRECT-CURRENT TO DIRECT-CURRENT CONVERTER, CONTROLLER AND CONTROL METHOD THEREOF, AND ELECTRONIC APPARATUS USING SAME

BACKGROUND

The present technology relates to a DC/DC (direct-current to direct-current) converter.

An electronic apparatus such as a personal computer, a game dedicated machine, or the like uses a DC/DC converter (switching regulator) for stepping down a direct-current voltage supplied from a battery or an inverter to a voltage level optimum for a load.

FIG. 1 is a circuit diagram showing an example of configuration of a step-down DC/DC converter considered by the present inventors. The DC/DC converter 2r of FIG. 1 is a multi-channel/multi-phase DC/DC converter. The DC/DC converter 2r includes an input line 4, an output line 6, M switching circuits SW1 to SWM, M inductors L1_1 to L1_M, output capacitors Co, a phase controller 116, an oscillator 118, a pulse modulator 120, and a distributing section 122.

The DC/DC converter 2r steps down an input voltage $V_{IN}$ of the input line 4 to a predetermined level, and supplies an output voltage $V_{OUT}$ to a load (not shown) connected to the output line 6. An input capacitor Ci for stabilizing the input voltage $V_{IN}$ is connected to the input line 4. The output capacitors Co for smoothing the output voltage $V_{OUT}$ are connected to the output line 6.

The plurality of switching circuit SW1 to SWM each include a switching transistor M1, a synchronous rectifier transistor M2, and a driver DRV. The ith switching circuit SWi generates a switching voltage VSWi at a point of connection (switching node) between the two transistors M1 and M2 by complementarily switching the two transistors.

The inductors L1_1 to L1_M are provided for each of the switching circuits SW1 to SWM. The ith inductor L1_i is provided between the switching node of the corresponding switching circuit SW1 and the output line 6.

The oscillator 118 generates a periodic signal $S_{OSC}$ having a predetermined frequency. The pulse modulator 120 is for example a pulse width modulator. The pulse modulator 120 generates a pulse signal $S_{PWM}$ in synchronism with the periodic signal $S_{OSC}$ on the basis of a feedback voltage $V_{FB}$ in accordance with the output voltage $V_{OUT}$. The feedback voltage $V_{FB}$ is for example a voltage obtained by dividing the output voltage $V_{OUT}$ by resistances R1 and R2. The pulse modulator 120 adjusts the duty ratio of the pulse signal $S_{PWM}$ such that the feedback voltage $V_{FB}$ coincides with a predetermined reference voltage $V_{REF}$. This feedback control stabilizes the output voltage $V_{OUT}$ at a target level $V_{REF} \times (R1+R2)/R2$.

The phase controller 116 sets the number K of driving phases. When M=4, for example, K can be selected from four values of 1, 2, 3, and 4.

The distributing section 122 selects K switching circuits among the M switching circuits SW1 to SWM, and distributes pulse signals $S_{PWM1}$ to $S_{PWMK}$ with a phase difference of (360/K) degrees to the selected K switching circuits, respectively.

The configuration of the DC/DC converter 2r has been described above. Operation of the DC/DC converter 2r will next be described. In the following, description will be made of a case where M=4 and the number K of driving phases can assume 2, 3, or 4. FIGS. 2A to 2C are waveform charts of switching voltages Vsw1 to Vsw4 when K=2, 3, and 4, respectively.

SUMMARY

The present inventors have come to recognize the following problems as a result of considering the DC/DC converter 2r of FIG. 1. A multi-channel DC/DC converter provides a high efficiency by controlling the number of driving phases according to a load current $I_{OUT}$, as compared with a single-channel DC/DC converter. However, a desire for energy saving in recent electronic apparatuses has increased further. It is difficult to satisfy the desire merely by simply converting DC/DC converters into multi-channel DC/DC converters.

The present technology has been made in view of such a problem. It is desirable to provide a DC/DC converter that can further reduce power consumption.

A mode of the present technology relates to an M-channel (M is an integer of at least two) synchronous rectification type step-down DC/DC converter. The step-down DC/DC converter includes: an input line supplied with a direct-current input voltage; an output line connected with a load; an output capacitor connected to the output line; M switching circuits associated with M channels; M inductors associated with the M channels; a power supply circuit generating an amplitude control voltage having a voltage level in accordance with an amplitude control signal; M drivers associated with the M channels; and a controller.

The M switching circuits each include a switching transistor and a synchronous rectifier transistor provided in series with each other between the input line and a ground line. The M inductors are each provided between a switching node of the switching circuit of the corresponding channel and the output line. The M drivers each generate a gate driving voltage for a high side and a gate driving voltage for a low side, the gate driving voltage for the high side and the gate driving voltage for the low side having a duty ratio in accordance with a pulse signal of the corresponding channel and having an amplitude in accordance with the amplitude control voltage, apply the gate driving voltage for the high side to a gate of the switching transistor of the corresponding switching circuit, and apply the gate driving voltage for the low side to a gate of the synchronous rectifier transistor of the corresponding switching circuit. The controller (i) calculates a load current on a basis of currents flowing through the M inductors, (ii) dynamically changes a number K of driving phases (K is an integer of up to M) on a basis of the calculated load current, (iii) generates the pulse signal adjusted in duty ratio such that an output voltage of the output line coincides with a predetermined reference voltage, (iv) selects K drivers among the M drivers, and distributes the pulse signal with a phase difference of (360/K) degrees to each of the selected K drivers, and (v) monotonically increases the amplitude control signal with respect to the calculated load current in a range determined in advance for each number K of driving phases.

In a single-channel DC/DC converter, a current flowing through a switching circuit depends on only load current $I_{OUT}$. On the other hand, in a multi-channel/multi-phase DC/DC converter, a current flowing through a switching circuit changes according to not only the load current $I_{OUT}$ but also the number K of driving phases. According to this mode, by changing the number of driving phases according to the load current, and changing the amplitude control signal, that is, the amplitude of the gate driving voltages for the switching transistor and the synchronous rectifier transistor in the range determined for the changed number of driving phases, a balance between the ON-resistance of the transistors and power consumed to charge and discharge gate capacitance is optimized for each load current, and thus efficiency can be increased.

The controller may decrease a value of the amplitude control signal each time the number K of driving phases is increased.

The controller may dynamically change the number K of driving phases and frequency of the pulse signal on the basis of the load current.

The present inventors have found that an amount of ripple of the output voltage changes according to a product of the frequency of the pulse signal (which frequency is referred to also as a switching frequency) and the number K of driving phases. According to this mode, an increase in the amount of ripple can be suppressed by changing the frequency of the pulse signal according to a change in the number K of driving phases.

The frequency of the pulse signal in each number of driving phases may be determined so as to reduce ripples of the output voltage as compared with a case where the frequency of the pulse signal is constant irrespective of the number of driving phases.

According to this mode, by making the switching frequency variable, and determining the switching frequency in each number of driving phases such that ripples of the output voltage do not increase, the amount of ripple can be reduced while a high efficiency is maintained.

The power supply circuit may be provided for each channel, and the power supply circuit for each channel may be included in a chip of the corresponding driver. In this case, wiring for routing the amplitude control voltage on a board on which the step-down DC/DC converter is mounted is not necessary, and therefore a reduction in area can be achieved.

The power supply circuit may be included in a chip of the controller. In this case, wiring for routing the amplitude control signal on the board on which the step-down DC/DC converter is mounted is not necessary, and therefore a reduction in area can be achieved. In addition, a terminal for outputting the amplitude control signal from the controller can be omitted. Further, an interface circuit for outputting a digital amplitude control signal or a D/A converter for outputting an analog amplitude control signal can be omitted. Therefore the cost and area of the controller can be reduced.

The power supply circuit and the M drivers may be included in a chip of the controller. In this case, the terminal for outputting the amplitude control signal from the controller can be omitted. Therefore the cost and area of the controller can be reduced. In addition, wiring for routing the amplitude control signal and the amplitude control voltage on the board on which the step-down DC/DC converter is mounted is not necessary, and therefore a reduction in area can be achieved.

The amplitude control voltage may include a first amplitude control voltage and a second amplitude control voltage. The amplitude control signal may include a first amplitude control signal and a second amplitude control signal.

The M drivers may each be configured to generate the gate driving voltage for the high side, the gate driving voltage for the high side having an amplitude in accordance with the first amplitude control voltage, for the switching transistor of the corresponding switching circuit, and the gate driving voltage for the low side, the gate driving voltage for the low side having an amplitude in accordance with the second amplitude control voltage, for the synchronous rectifier transistor of the corresponding switching circuit. The controller may be configured to generate the first amplitude control signal and the second amplitude control signal independently indicating the respective amplitudes of the gate driving voltage for the high side and the gate driving voltage for the low side on the basis of the calculated load current. The power supply circuit may be configured to generate the first amplitude control voltage in accordance with the first amplitude control signal and generate the second amplitude control voltage in accordance with the second amplitude control signal.

In this case, the gate driving voltages for the switching transistor M1 and the synchronous rectifier transistor M2 can be optimized independently of each other. Therefore efficiency can be further increased.

Another mode of the present technology is an electronic apparatus. The electronic apparatus includes the DC/DC converter according to one of the above-described modes.

Another mode of the present technology relates to a controller used in an M-channel (M is an integer of at least two) synchronous rectification type step-down DC/DC converter. In addition to the controller, the step-down DC/DC converter includes an input line supplied with a direct-current input voltage, an output line connected with a load, an output capacitor connected to the output line, M switching circuits associated with M channels, the M switching circuits each including a switching transistor and a synchronous rectifier transistor provided in series with each other between the input line and a ground line, M inductors associated with the M channels, the M inductors each being provided between a switching node of the switching circuit of the corresponding channel and the output line, a power supply circuit generating an amplitude control voltage having a voltage level in accordance with an amplitude control signal, and M drivers associated with the M channels, the M drivers each generating a gate driving voltage for a high side and a gate driving voltage for a low side, the gate driving voltage for the high side and the gate driving voltage for the low side having a duty ratio in accordance with a pulse signal of the corresponding channel and having an amplitude in accordance with the amplitude control voltage, applying the gate driving voltage for the high side to a gate of the switching transistor of the corresponding switching circuit, and applying the gate driving voltage for the low side to a gate of the synchronous rectifier transistor of the corresponding switching circuit.

The controller includes: a current detecting section calculating a load current on a basis of currents flowing through the M inductors; a phase controller dynamically changing a number K of driving phases (K is an integer of up to M) on a basis of the calculated load current; a pulse modulator for generating the pulse signal adjusted in duty ratio such that an output voltage of the output line coincides with a predetermined reference voltage; a pulse distributing section selecting K drivers among the M drivers, and distributing the pulse signal with a phase difference of (360/K) degrees to each of the selected K drivers; and a driving voltage control section monotonically increasing the amplitude control signal with respect to the calculated load current in a range determined in advance for each number K of driving phases. The controller is formed as one package.

According to this mode, efficiency can be increased by changing the number of driving phases according to the load current, and changing the amplitude control signal, that is, the gate driving voltages for the switching transistor and the synchronous rectifier transistor in the range determined for the changed number of driving phases.

Yet another mode of the present technology relates to a controller used in an M-channel (M is an integer of at least two) synchronous rectification type step-down DC/DC converter. In addition to the controller, the DC/DC converter includes an input line supplied with a direct-current input voltage, an output line connected with a load, an output capacitor connected to the output line, M switching circuits associated with M channels, M inductors associated with the M channels, a power supply circuit, and M drivers associated with the M channels. The M switching circuits each include a switching transistor and a synchronous rectifier transistor provided in series with each other between the input line and a ground line. The M inductors are each provided between a switching node of the switching circuit of the corresponding channel and the output line. The power supply circuit generates an amplitude control voltage having a voltage level in accordance with an amplitude control signal. The M drivers each generate a gate driving voltage for a high side and a gate driving voltage for a low side, the gate driving voltage for the high side and the gate driving voltage for the low side having a duty ratio in accordance with a pulse signal of the corresponding channel and having an amplitude in accordance with the amplitude control voltage, apply the gate driving voltage for the high side to a gate of the switching transistor of the corresponding switching circuit, and apply the gate driving voltage for the low side to a gate of the synchronous rectifier transistor of the corresponding switching circuit.

The controller includes: a current detecting section calculating a load current on a basis of currents flowing through the M inductors; a pulse modulator for generating the pulse signal adjusted in duty ratio such that an output voltage of the output line coincides with a predetermined reference voltage; an arithmetic processing section determining a combination of a number K of driving phases (K is an integer of up to M), the amplitude control signal, and frequency of the pulse signal according to the load current; and a pulse distributing section selecting K drivers among the M drivers, and distributing the pulse signal with a phase difference of (360/K) degrees to each of the selected K drivers. The controller is formed as one package.

According to this mode, efficiency can be increased by optimizing the combination of the three parameters, that is, the amplitude of the gate driving voltages for the switching transistor and the synchronous rectifier transistor, the number of driving phases, and the switching frequency, according to the load current.

Still another mode of the present technology is a control method of an M-channel (M is an integer of at least two) synchronous rectification type step-down direct-current to direct-current converter. The step-down direct-current to direct-current converter includes: an input line supplied with a direct-current input voltage; an output line connected with a load; an output capacitor connected to the output line; M switching circuits associated with M channels, the M switching circuits each including a switching transistor and a synchronous rectifier transistor provided in series with each other between the input line and a ground line; M inductors associated with the M channels, the M inductors each being provided between a switching node of the switching circuit of the corresponding channel and the output line; a power supply circuit generating an amplitude control voltage having a voltage level in accordance with an amplitude control signal; and M drivers associated with the M channels, the M drivers each generating a gate driving voltage for a high side and a gate driving voltage for a low side, the gate driving voltage for the high side and the gate driving voltage for the low side having a duty ratio in accordance with a pulse signal of the corresponding channel and having an amplitude in accordance with the amplitude control voltage, applying the gate driving voltage for the high side to a gate of the switching transistor of the corresponding switching circuit, and applying the gate driving voltage for the low side to a gate of the synchronous rectifier transistor of the corresponding switching circuit. The control method includes: calculating a load current on a basis of currents flowing through the M inductors; dynamically changing a number K of driving phases (K is an integer of up to M) on a basis of the calculated load current; generating the pulse signal adjusted in duty ratio such that an output voltage of the output line coincides with a predetermined reference voltage; selecting K drivers among the M drivers, and distributing the pulse signal with a phase difference of (360/K) degrees to each of the selected K drivers; and generating the amplitude control signal on the basis of the calculated load current, and monotonically increasing the amplitude control signal with respect to the calculated load current in a range determined in advance for each number K of driving phases.

A further mode of the present technology is a step-down direct-current to direct-current converter including: an output line connected with a load; an inductor; a switching transistor connected to the inductor; a feedthrough capacitor provided between the inductor and the output line, the feedthrough capacitor functioning as an output capacitor for smoothing an output voltage; and a controller detecting a current flowing through the inductor on a basis of a voltage drop across the feedthrough capacitor, and reflecting the detected current in control of the switching transistor.

It is to be noted that arbitrary combinations of the above-described constituent elements as well as modes realized by converting expressions of the present technology between a method, a device, a system, and the like are also effective as modes of the present technology.

According to the present technology, efficiency of a step-down DC/DC converter can be increased.

BRIEF DESCRIPTION OF THE DRAWINGS

FIG. 6A is a diagram showing the amplitude control voltage $V_{DRV}$ providing a maximum efficiency at each load current $I_{OUT}$ in each number K of driving phases, and FIG. 6B is a diagram showing an optimum relation between the load current $I_{OUT}$ and the combination of the number K of driving phases and the amplitude control signal $S_{CNT}$;

DETAILED DESCRIPTION OF THE PREFERRED EMBODIMENTS

Figure 1:
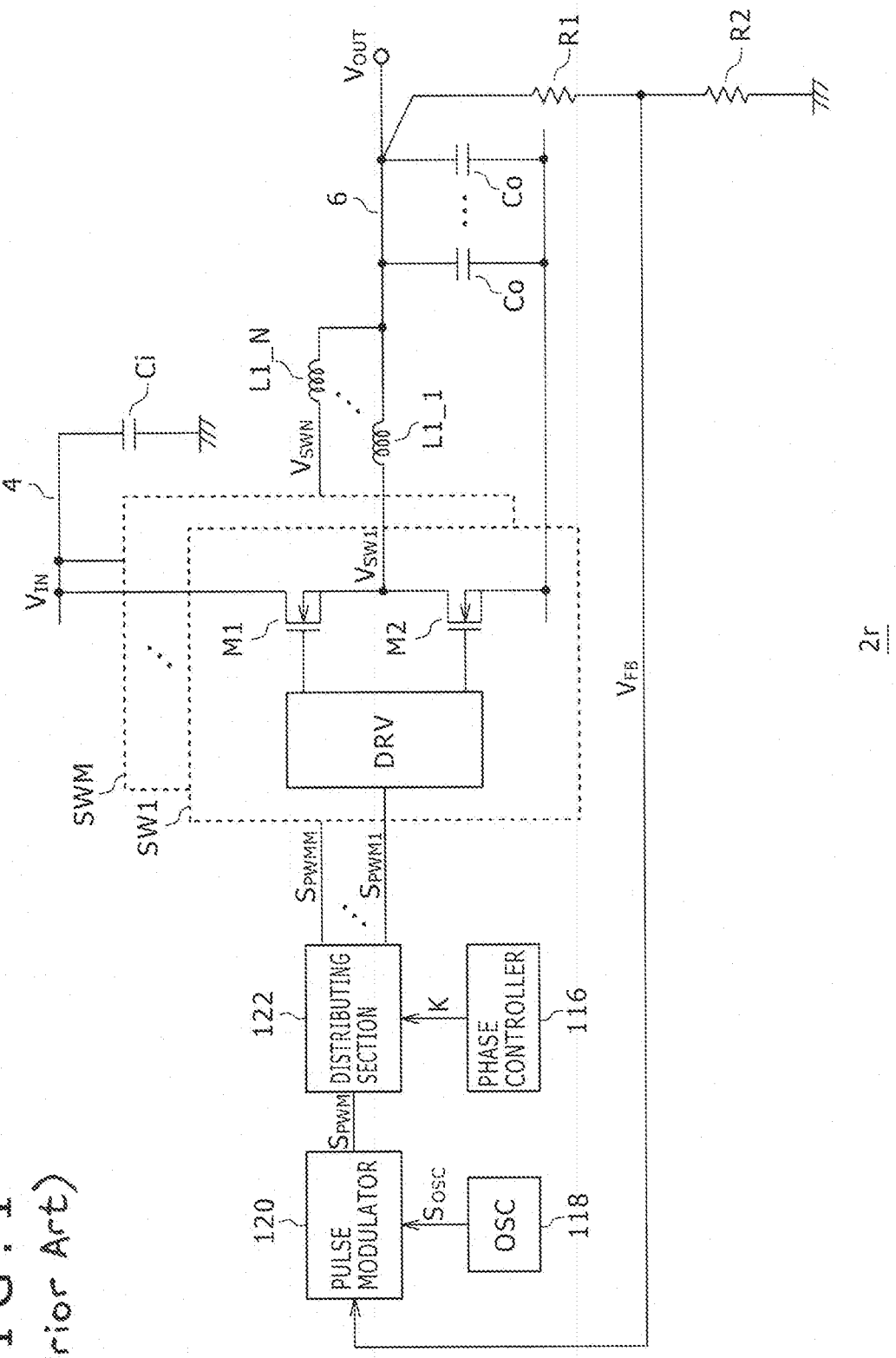
FIG. 1 is a circuit diagram showing an example of configuration of a step-down DC/DC converter considered by the present inventors.
Figure 2A:
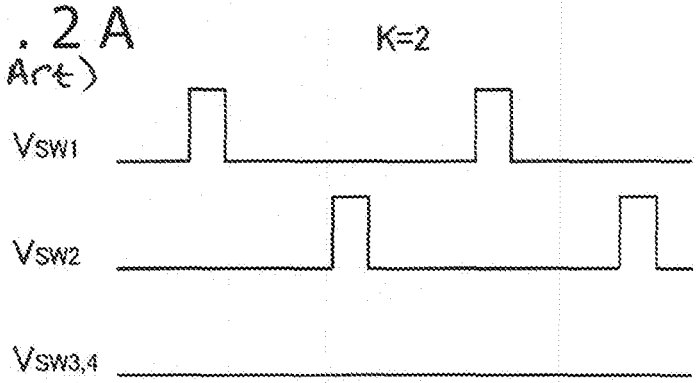
FIGS. 2A, 2B, and 2C are waveform charts of switching voltages Vsw1 to Vsw4 when K=2, 3, and 4, respectively.
Figure 2B:
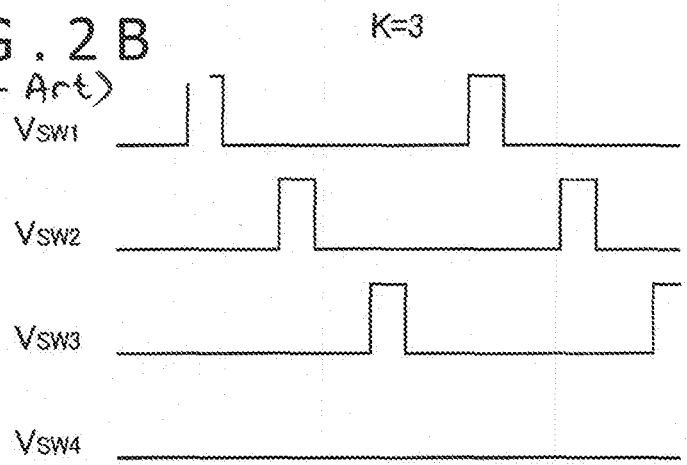
Figure 2C:
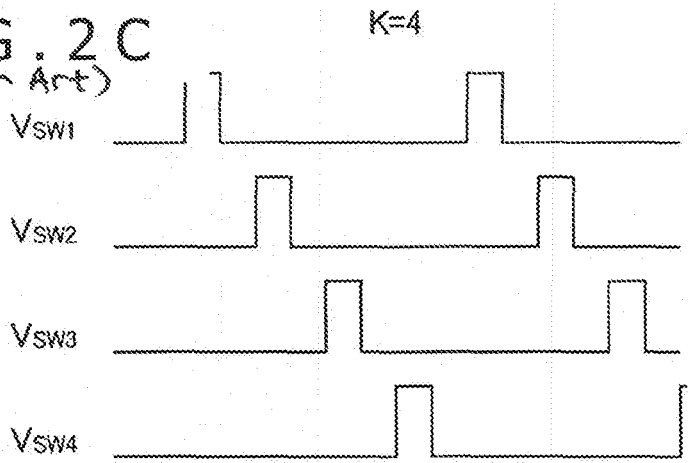

The present technology will hereinafter be described on the basis of preferred embodiments thereof with reference to the drawings. Identical or equivalent constituent elements, members, and processes shown in each drawing are identified by the same reference numerals, and repeated description thereof will be omitted as appropriate. In addition, the embodiments are not intended to limit the technology, but exemplify the technology. All of features and combinations thereof described in the embodiments are not necessarily essential to the technology.

In the present specification, a state in which "a member A is connected to a member B" includes a case in which the member A and the member B are physically directly connected to each other and a case in which the member A and the member B are indirectly connected to each other via another member that does not affect a state of electric connection therebetween.

Similarly, a state in which "a member C is provided between the member A and the member B" includes a case in which the member A and the member C or the member B and the member C are directly connected to each other as well as a case in which the member A and the member C or the member B and the member C are indirectly connected to each other via another member that does not affect a state of electric connection therebetween.

Figure 3:
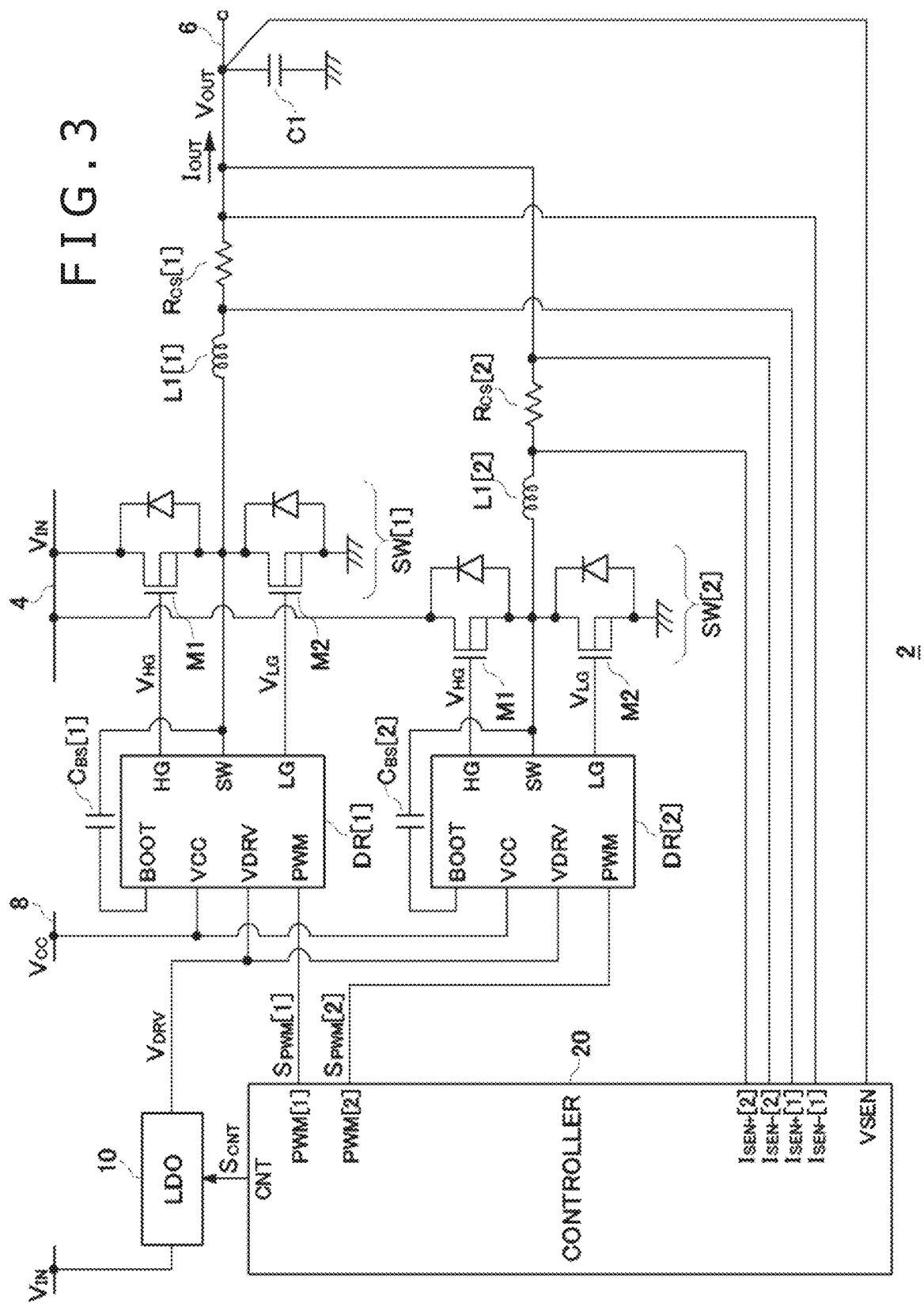
FIG. 3 is a circuit diagram of a step-down DC/DC converter according to an embodiment.

FIG. 3 is a circuit diagram of a step-down DC/DC converter according to an embodiment. The DC/DC converter 2 is an M-channel (M is an integer of two or more) multi-channel/multi-phase DC/DC converter. The DC/DC converter 2 steps down an input voltage $V_{IN}$ of an input line 4 to a predetermined level, and supplies an output voltage $V_{OUT}$ to a load (not shown) connected to an output line 6. FIG. 3 shows a configuration of M=2 channels. Suppose that the input voltage $V_{IN}$ is 12 V, that the output voltage $V_{OUT}$ is 1.5 V, and that a power supply voltage Vcc is 5 V.

An inductor L1, a switching circuit SW, a plurality of current detecting resistances $R_{CS}$, and a driver DR are provided for each channel CH. A number in square brackets represents a channel number.

An output capacitor C1 is connected to the output line 6, and smoothes the output voltage $V_{OUT}$. Switching circuits SW[1] to SW[M] are associated with a plurality of channels CH1 to CHM. The switching circuits SW[1] to SW[M] each include a switching transistor (high-side transistor) M1 and a synchronous rectifier transistor (low-side transistor) M2 provided in series with each other between the input line 4 and a ground line. The switching transistor M1 and the synchronous rectifier transistor M2 are both an N-channel MOSFET.

The inductor L1 and the current detecting resistance $R_{CS}$ are provided in series with each other between the output (switching node) of the corresponding switching circuit SW and the output line 6. The current detecting resistance $R_{CS}$ causes a voltage drop proportional to a current flowing through the corresponding inductor L1. A voltage across the current detecting resistance $R_{CS}$ is input to current detecting terminals ISEN+ and ISEN− of a controller 20. The controller 20 calculates a load current $I_{OUT}$ on the basis of the voltage drop of the current detecting resistance $R_{CS}$.

In addition, the output voltage $V_{OUT}$ generated in the output line 6 is fed back to a voltage detecting (VSEN) terminal of the controller 20.

The controller 20 generates pulse signals $S_{PWM}[1]$ to $S_{PWM}[M]$ for controlling the switching circuits SW[1] to SW[M] so that the output voltage $V_{OUT}$ fed back to the voltage detecting terminal VSEN approaches a predetermined target value.

A power supply circuit 10 generates an amplitude control voltage $V_{DRV}$ having a voltage level in accordance with an amplitude control signal $S_{CNT}$. This amplitude control signal $S_{CNT}$ is generated by the controller 20 to be described later. The power supply circuit 10 is a linear regulator, a switching regulator, a charge pump circuit, or the like. The configuration of the power supply circuit 10 is not particularly limited.

Drivers DR[1] to DR[M] are associated with the plurality of channels CH1 to CHM. Each driver DR has a switching terminal SW connected to the switching node of the corresponding switching circuit SW, a boot terminal BOOT for connecting a bootstrap capacitor $C_{BS}$, an output terminal HG for a high side which output terminal HG is connected to the gate of the switching transistor M1, an output terminal LG for a low side which output terminal LG is connected to the gate of the synchronous rectifier transistor M2, a PWM terminal for receiving the pulse signal $S_{PWM}$ of the corresponding channel, a driving voltage terminal VDRV for receiving the amplitude control voltage $V_{DRV}$, and a power supply terminal VCC to which the power supply voltage Vcc is input.

The ith driver [i] (1≤i≤M) generates a gate driving voltage $V_{HG}$ for the high side and a gate driving voltage $V_{LG}$ for the low side, the gate driving voltage $V_{HG}$ for the high side and the gate driving voltage $V_{LG}$ for the low side having a duty ratio in accordance with the pulse signal $S_{PWM}[i]$ and having an amplitude in accordance with the amplitude control voltage $V_{DRV}$, on the basis of the pulse signal $S_{PWM}[i]$ of the corresponding channel CHi, and applies the gate driving voltage $V_{HG}$ for the high side to the gate of the switching transistor M1 of the corresponding switching circuit SW[i] and applies the gate driving voltage $V_{LG}$ for the low side to the gate of the synchronous rectifier transistor M2 of the corresponding switching circuit SW[i].

The configuration of the driver DR is not particularly limited. A commercially available product may be used as the driver DR, or a product manufactured using a publicly known configuration may be used as the driver DR. The drivers DR may each be formed as a single chip or module, or the drivers of the plurality of channels may be formed as a single chip or module. Alternatively, the drivers DR may be formed by mounting discrete parts on a board.

The driver DR includes a high-side driver for driving the switching transistor M1 and a low-side driver for driving the synchronous rectifier transistor M2 (not shown).

Because the switching transistor M1 is an N-channel MOSFET, the high-side driver is formed by a so-called bootstrap circuit. The bootstrap capacitor $C_{BS}$ is connected between the boot terminal BOOT and the switching terminal SW of the driver DR.

The high-side driver (i) applies a driving voltage $V_{HG}=V_{DRV}+V_{IN}$ to the gate of the switching transistor M1 so that the switching transistor M1 is on during an interval that the pulse signal $S_{PWM}$ is at a high level, and (ii) applies a driving voltage $V_{HG}=0$ V to the gate of the switching transistor M1 so that the switching transistor M1 is off during an interval that the pulse signal $S_{PWM}$ is at a low level.

The low-side driver switches the synchronous rectifier transistor M2 in inverted logic relation to the corresponding pulse signal $S_{PWM}$, that is, complementarily to the switching transistor M1. Specifically, the low-side driver (i) applies a driving voltage $V_{LG}=V_{DRV}$ to the gate of the synchronous rectifier transistor M2 so that the synchronous rectifier transistor M2 is on during an interval that the pulse signal $S_{PWM}$ is at a low level, and (ii) applies a driving voltage $V_{LG}=0$ V to the gate of the synchronous rectifier transistor M2 so that the synchronous rectifier transistor M2 is off during an interval that the pulse signal $S_{PWM}$ is at a high level.

In addition, to prevent the switching transistor M1 and the synchronous rectifier transistor M2 from being turned on simultaneously, the driver DR inserts a dead time between the on interval of the switching transistor M1 and the on interval of the synchronous rectifier transistor M2.

The controller 20 has output terminals PWM[1] to PWM [M] for outputting the pulse signals $S_{PWM}[1]$ to $S_{PWM}[M]$ and a control terminal CNT for outputting the amplitude control signal $S_{CNT}$ in addition to the current detecting terminals ISEN+ and ISEN− provided for each channel.

The controller 20 is configured to have the following functions of:

(i) calculating the load current $I_{OUT}$ on the basis of currents flowing through the M inductors, and (ii) dynamically changing a number K of driving phases (K is an integer of M or less) on the basis of the calculated load current $I_{OUT}$. In addition, the controller 20 (iii) generates a pulse signal $S_{PWM}$ adjusted in duty ratio such that the output voltage $V_{OUT}$ of the output line 6 coincides with a predetermined reference voltage $V_{REF}$, and (iv) selects K drivers DR (for example DR[1] to DR[K]) among the M drivers DR[1] to DR[M], and distributes pulse signals $S_{PWM}[1]$ to $S_{PWM}[K]$ with a phase difference of (360/K) degrees to the selected K drivers DR[1] to DR[K], respectively.

Further, the controller 20 (v) generates the amplitude control signal $S_{CNT}$, and outputs the amplitude control signal $S_{CNT}$ to the power supply circuit 10. The controller 20 monotonically increases the amplitude control signal $S_{CNT}$ with respect to the calculated load current $I_{OUT}$ in a range determined in advance for each number K of driving phases.

The range (that is, an upper limit value and a lower limit value) of the amplitude control signal $S_{CNT}$ for each number K of driving phases is desirably set such that the DC/DC converter 2 as a whole provides highest efficiency. In addition, relation between the load current $I_{OUT}$ and the amplitude control signal $S_{CNT}$ in each range is desirably set such that the DC/DC converter 2 as a whole provides highest efficiency.

Figure 4:
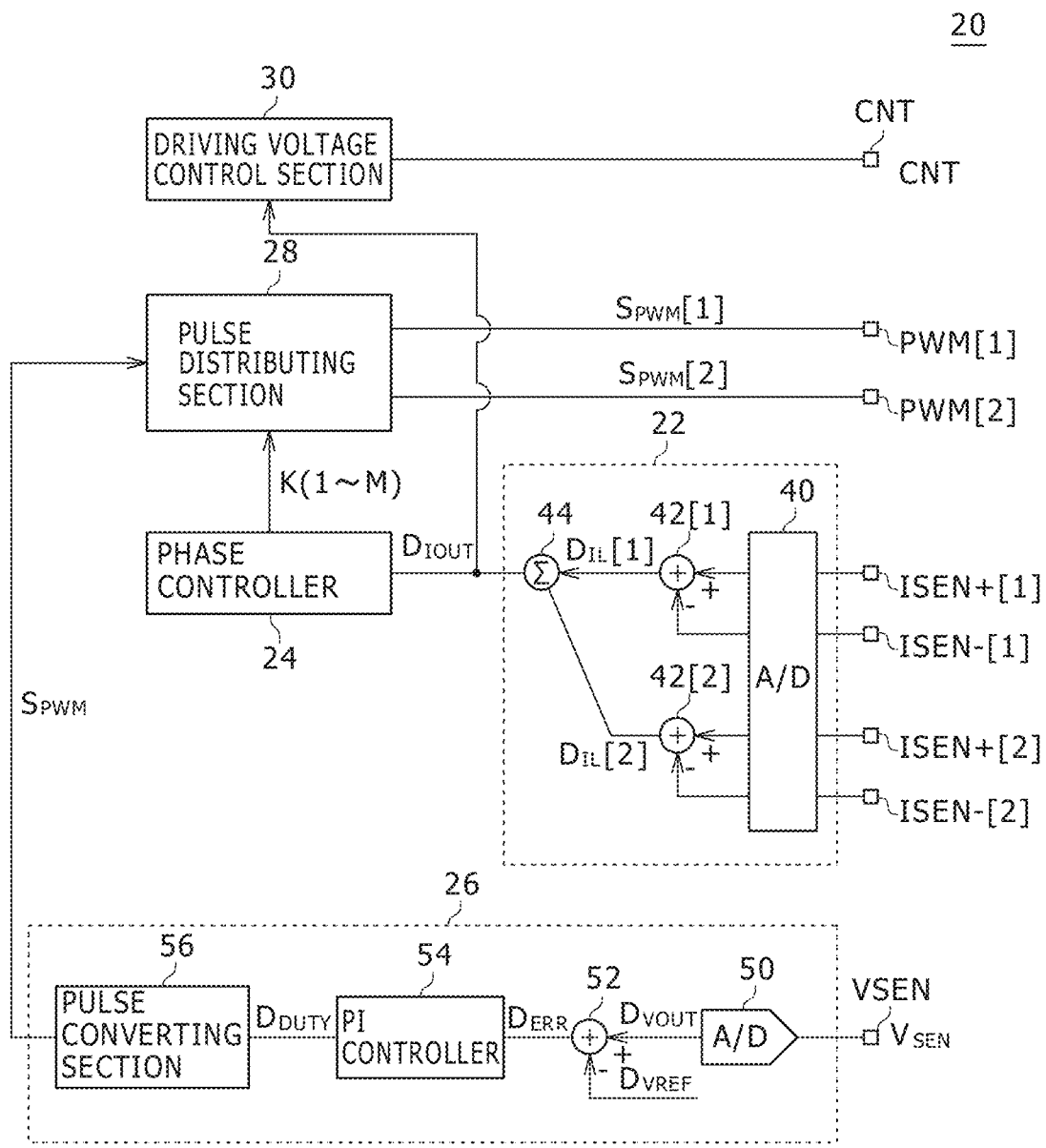
FIG. 4 is a block diagram showing a configuration of a controller.

FIG. 4 is a block diagram showing a configuration of the controller 20. The controller 20 is a DSP (Digital Signal Processor), an ASIC (Application Specified IC), an FPGA (Field Programmable Gate Array), or the like. The controller 20 includes a current detecting section 22, a phase controller 24, a pulse modulator 26, a pulse distributing section 28, and a driving voltage control section 30. The controller 20 is housed in one package. Of course, the controller 20 may be a module formed by packaging a combination of a plurality of semiconductor chips.

The current detecting section 22 calculates the load current $I_{OUT}$ on the basis of the currents flowing through the M inductors L1[1] to L1[M]. The current detecting section 22 for example includes an A/D (analog to digital) converter 40, a subtracter 42, and an adder 44. The A/D converter 40 converts the terminal voltages of the current detecting resistances $R_{CS}$ of the plurality of channels CH1 to CHM into digital values. The subtracter 42 of each channel generates a difference $D_{IL}$ between two terminal voltages obtained in the corresponding channel. The difference $D_{IL}$ indicates a current $I_L$ flowing through the coil of each channel. The adder 44 adds together the digital values $D_{IL}$ of all of the channels or active channels. This addition value $D_{IOUT}$ indicates the load current $I_{OUT}$.

The phase controller 24 dynamically changes the number K of driving phases (K is an integer of M or less) on the basis of the load current $D_{IOUT}$ calculated by the current detecting section 22. Relation between the load current $D_{IOUT}$ and the number K of driving phases is determined by experiment or simulation in consideration of efficiency, an allowed amount of ripple of the output voltage $V_{OUT}$, and the like in a design stage of the controller 20. The phase controller 24 may determine the number K of driving phases by a predetermined determination expression corresponding to the predetermined relation, or may retain a table defining the predetermined relation and determine the number K of driving phases by referring to the table.

The pulse modulator 26 generates the pulse signal $S_{PWM}$ adjusted in duty ratio such that the output voltage $V_{OUT}$ of the output line 6 coincides with a predetermined reference voltage $V_{REF}$. The pulse modulator 26 includes for example an A/D converter 50, a subtracter 52, a feedback controller 54, and a pulse converting section 56. The A/D converter 50 converts the output voltage $V_{OUT}$ input to a VSEN terminal into a digital value $D_{VOUT}$. The subtracter 52 generates an error signal $D_{ERR}$ indicating a difference between the digital value $D_{VOUT}$ and a digital reference value $D_{VREF}$ in accordance with the reference voltage $V_{REF}$. The feedback controller 54 generates a duty ratio amplitude control signal $D_{DUTY}$ whose value is adjusted so that the error signal $D_{ERR}$ becomes zero. The feedback controller 54 for example performs PI (proportional-plus-integral) control, PID (proportional-plus-integral-plus-derivative) control, or the like. The pulse converting section 56 generates a pulse signal $S_{PWM}$ having a duty ratio in accordance with the duty ratio amplitude control signal $D_{DUTY}$. The pulse converting section 56 may be formed by a digital counter, for example. The pulse modulator 26 can be formed by an analog circuit using an error amplifier. In addition, the modulation system of the pulse modulator 26 is not particularly limited, but various types of modulation that are publicly known or to be usable in the future, such as a voltage mode, a current mode, and the like can be adopted as the modulation system of the pulse modulator 26.

The pulse distributing section 28 selects K drivers DR among the M drivers DR[1] to DR[M], and distributes pulse signals $S_{PWM}[1]$ to $S_{PWM}[K]$ with a phase difference of (360/K) degrees to the selected K drivers DR[1] to DR[K], respectively.

The range of variation of the amplitude control signal $S_{CNT}$ is determined in advance for each number K of driving phases. The driving voltage control section 30 monotonically increases the amplitude control signal $S_{CNT}$ with respect to the load current $I_{OUT}$ within the predetermined variation range for each number K of driving phases. As described above, the relation between the load current $I_{OUT}$ and the amplitude control signal $S_{CNT}$ is determined in advance. The driving voltage control section 30 may determine the amplitude control signal $S_{CNT}$ by a predetermined arithmetic expression corresponding to the predetermined relation, or may retain a table defining the predetermined relation and determine the amplitude control signal $S_{CNT}$ by referring to the table.

An interface for transmitting and receiving the amplitude control signal $S_{CNT}$ between the power supply circuit 10 and the controller 20 is not particularly limited. When the amplitude control signal $S_{CNT}$ is a digital signal, for example, an interface circuit for an I$^2$C (Inter IC) bus is mounted in the power supply circuit 10 and the controller 20. In addition, the power supply circuit 10 includes a D/A (digital to analog) converter for converting the received amplitude control signal $S_{CNT}$ into an analog reference voltage $V_{CNT}$. The power supply circuit 10 stabilizes the amplitude control voltage $V_{DRV}$ by feedback such that the amplitude control voltage $V_{DRV}$ coincides with the reference voltage $V_{CNT}$.

Alternatively, when the amplitude control signal $S_{CNT}$ is an analog voltage, the controller 20 may further include a D/A converter provided in a stage subsequent to the driving voltage control section 30. That is, the power supply circuit 10 can use the amplitude control signal $S_{CNT}$ as the reference voltage $V_{CNT}$ as it is.

The configuration of the DC/DC converter 2 and the controller 20 has been described above.

Relation between the load current $I_{OUT}$, the number K of driving phases, and the amplitude control signal $S_{CNT}$ will next be described.

This relation can be obtained by the following processing in either the design stage of the controller 20, the design stage of the DC/DC converter 2, or the design stage of an electronic apparatus including the DC/DC converter 2.

A combination of the number K of driving phases and the amplitude control voltage $V_{DRV}$ is changed as parameters, and relation between the load current $I_{OUT}$ and the efficiency of the DC/DC converter 2 is obtained for each combination. The obtainment in this case may be performed by an actual measurement or simulation. The present inventors actually measured the relation between the load current $I_{OUT}$ and the efficiency η for the following eight combinations in an actual two-channel DC/DC converter.

| | | | | |
|---|---|---|---|---|
| (1) | K = | 1 | $V_{DRV}=$ | 6 V |
| (2) | K = | 1 | $V_{DRV}=$ | 7 V |
| (3) | K = | 1 | $V_{DRV}=$ | 8 V |
| (4) | K = | 1 | $V_{DRV}=$ | 9 V |
| (5) | K = | 2 | $V_{DRV}=$ | 6 V |
| (6) | K = | 2 | $V_{DRV}=$ | 7 V |
| (7) | K = | 2 | $V_{DRV}=$ | 8 V |
| (8) | K = | 2 | $V_{DRV}=$ | 9 V |

Figure 5:
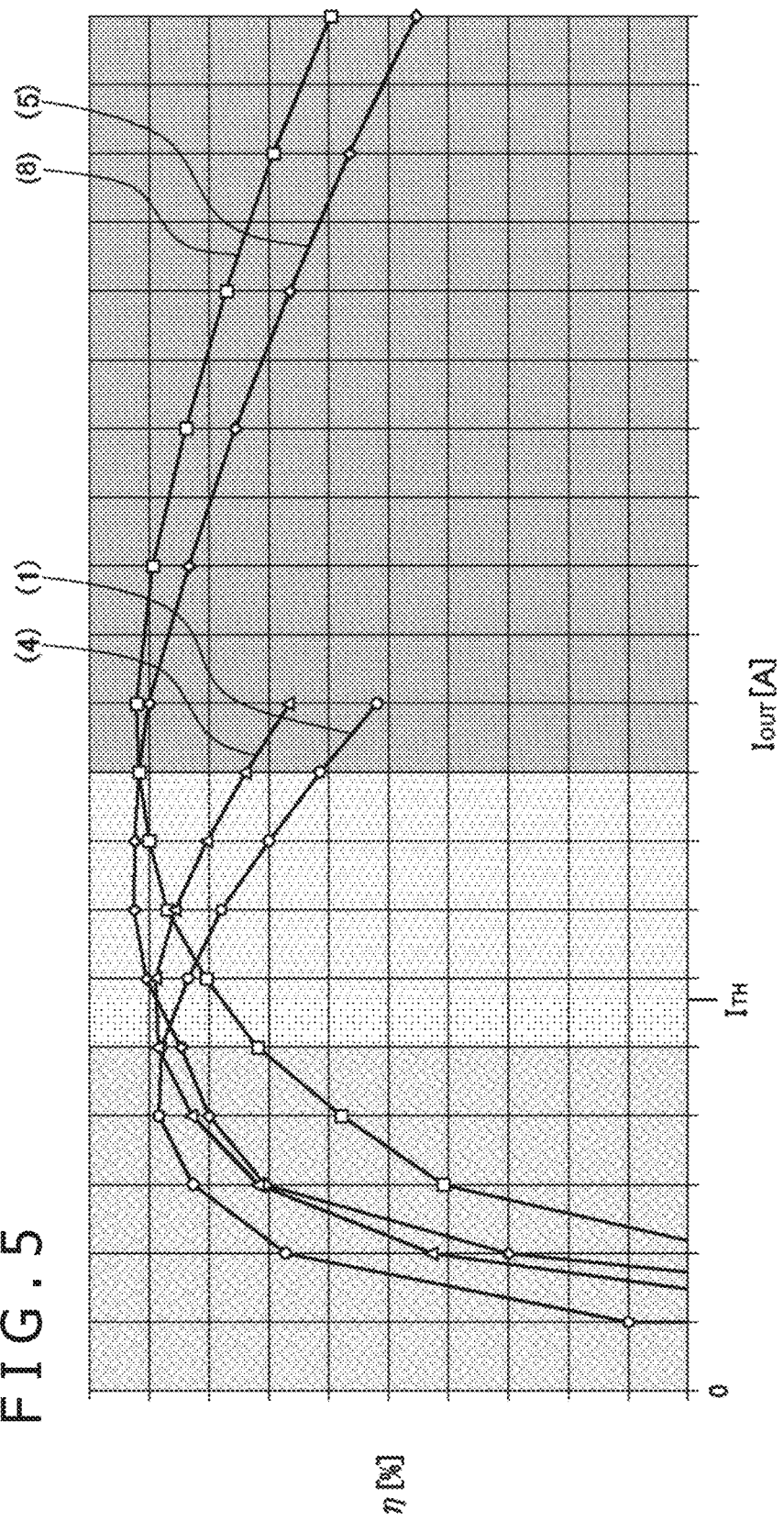
FIG. 5 is a diagram showing relation between a load current $I_{OUT}$ and the efficiency η of the DC/DC converter when a combination of the number K of driving phases and an amplitude control voltage $V_{DRV}$ is changed as parameters.

FIG. 5 is a diagram showing the relation between the load current $I_{OUT}$ and the efficiency η of the DC/DC converter 2 when the combination of the number K of driving phases and the amplitude control voltage $V_{DRV}$ is changed as parameters. FIG. 5 representatively shows (1) K=1, $V_{DRV}$=6 V, (4) K=1, $V_{DRV}$=9 V, (5) K=2, $V_{DRV}$=6 V, and (8) K=2, $V_{DRV}$=9 V.

From the load current $I_{OUT}$ and the efficiency η of the DC/DC converter 2 that were thus obtained, a combination of parameters providing a maximum efficiency η is determined for each load current $I_{OUT}$.

FIG. 6A is a diagram showing the amplitude control voltage $V_{DRV}$ providing a maximum efficiency at each load current $I_{OUT}$ in each number K of driving phases.

FIG. 6B is a diagram showing an optimum relation between the load current $I_{OUT}$ and the combination of the number K of driving phases and the amplitude control signal $S_{CNT}$. Referring to FIG. 5, the combination (4) of K=1 and the combination (5) of K=2 intersect each other at a certain threshold value $I_{TH}$. Hence, K=1 is optimum when $I_{OUT}<I_{TH}$, and K=2 is optimum when $I_{OUT}>I_{TH}$. In addition, the relation between the load current $I_{OUT}$ and the amplitude control voltage $V_{DRV}$ is in accordance with the characteristic when K=1 in FIG. 6A in the range of $I_{OUT}<I_{TH}$, and is in accordance with the characteristic when K=2 in FIG. 6A in the range of $I_{OUT}>I_{TH}$.

The controller 20, or more specifically the phase controller 24 and the driving voltage control section 30 are designed on the basis of the thus obtained relation.

Specifically, the phase controller 24 is designed to compare the load current $I_{OUT}$ with the threshold value $I_{TH}$, and set K=1 when $I_{OUT}<I_{TH}$ or set K=2 when $I_{OUT}>I_{TH}$.

In addition, in the driving voltage control section 30, the variation range $V_{RANGE}$ of the amplitude control signal $S_{CNT}$ is determined such that $V_{RANGE1}=V_1$ to $V_2$ for the number K=1 of driving phases, and such that $V_{RANGE2}=V_1$ to $V_3$ for the number K=2 of driving phases. That is, each time the number K of driving phases is increased, the controller 20 temporarily decreases the value of the amplitude control voltage $V_{DRV}$, that is, the amplitude of the respective gate driving voltages for the switching transistor M1 and the synchronous rectifier transistor M2.

Then, in each number of driving phases, the amplitude control signal $S_{CNT}$ is defined so as to monotonically increase with respect to the load current $I_{OUT}$ within the predetermined variation range $V_{RANGE}$. As for a curve of the monotonic increase, a plot obtained by the result of the experiment shown in FIG. 6B (or a result of simulation) may be stored in a table of the driving voltage control section 30, and read out. Alternatively, a curve obtained by approximating the curve obtained by the experiment may be used as the curve of the monotonic increase. An approximating algorithm is not particularly limited. However, when the result of the experiment shown in FIG. 6B is obtained, a linear approximation or a polynomial approximation can be used. When a linear approximation or a polynomial approximation is used, an optimum amplitude control voltage $V_{DRV}$ can be generated by simple arithmetic processing.

Incidentally, the driving voltage control section 30 does not necessarily need to monotonically increase the amplitude control signal $S_{CNT}$ continuously, but may monotonically increase the amplitude control signal $S_{CNT}$ discretely with multiple values.

Operation of the DC/DC converter 2 will next be described.

A load on the DC/DC converter 2 is for example a CPU (Central Processing Unit) or a GPU (Graphics Processing Unit). The load current $I_{OUT}$ supplied from the DC/DC converter 2 to the load in this case varies greatly according to an operation rate, an operating frequency, and the like of the load.

The controller 20 of the DC/DC converter 2 calculates the load current $I_{OUT}$ momently, and monitors variations in the load current $I_{OUT}$. The controller 20 selects an optimum number K of driving phases and the amplitudes of the gate driving voltages $V_{HG}$ and $V_{LG}$ according to the load current $I_{OUT}$ at the moment.

Specifically, the controller 20 increases the number K of driving phases as the load current $I_{OUT}$ is increased, and in each number K of driving phases, increases the amplitudes of the gate driving voltages $V_{HG}$ and $V_{LG}$ as the load current $I_{OUT}$ is increased.

The operation of the DC/DC converter 2 has been described above.

Advantages of the DC/DC converter 2 will next be described.

The power consumption of the DC/DC converter 2 is divided into (i) power consumption for switching the switching transistor M1 and the synchronous rectifier transistor M2, (ii) power losses occurring in the ON-resistances of the switching transistor M1 and the synchronous rectifier transistor M2, and (iii) other power consumptions.

(i) is the power necessary to charge and discharge the gate capacitance of the switching transistor M1 and the synchronous rectifier transistor M2. The power consumption of (i) therefore increases as the amplitude of gate-to-source voltage of the switching transistor M1 and the synchronous rectifier transistor M2 is increased. On the other hand, the ON-resistance of a MOSFET is decreased as the gate-to-source voltage becomes higher, and therefore a power loss in the ON-resistance is decreased as the gate-to-source voltage is increased. That is, (i) and (ii) can be said to be in a trade-off relation.

As for the efficiency η of the DC/DC converter 2, the power consumption of (i) is dominant in a region where the load current $I_{OUT}$ is small, and the power losses of (ii) are dominant in a region where the load current $I_{OUT}$ is large.

In a single-channel DC/DC converter, a current flowing through a switching circuit depends on only load current $I_{OUT}$. Hence, high efficiency could be obtained when the amplitude $V_{DRV}$ of driving voltages $V_{HG}$ and $V_{LG}$ is monotonically increased according to the load current $I_{OUT}$.

On the other hand, in the multi-channel/multi-phase DC/DC converter, the current flowing through the switching circuit changes according to not only the load current $I_{OUT}$ but also the number K of driving phases. Hence, high efficiency cannot necessarily be obtained when the amplitude $V_{DRV}$ of the driving voltages $V_{HG}$ and $V_{LG}$ is simply monotonically increased with respect to the load current $I_{OUT}$. This is confirmed from a fact that the amplitude $V_{DRV}$ of the optimum driving voltage decreases discontinuously at a certain threshold value $I_{TH}$, as shown in FIG. 6B.

According to the DC/DC converter 2 according to the embodiment, by changing the number K of driving phases according to the load current $I_{OUT}$, and changing the amplitude control signal $S_{CNT}$, that is, the gate driving voltage $V_{DRV}$ for the switching transistor and the synchronous rectifier transistor in a range determined for the changed number K of driving phases, a balance between the losses (i) and (ii) occurring in the DC/DC converter 2 is changed, so that efficiency η can be increased.

The present technology has been described above on the basis of embodiments thereof. The foregoing embodiments are illustrative, and it is to be understood by those skilled in the art that combinations of constituent elements and processing processes of the embodiments are susceptible of various modifications and that such modifications also fall within the scope of the present technology. Such modifications will be described in the following.

First Modification

The controller 20, or more specifically the pulse modulator 26 may change the frequency of the pulse signal $S_{PWM}$ (switching frequency) according to the number K of driving phases. In this case, it suffices to input the number K of driving phases to the pulse converting section 56, and change the cycle of the pulse signal $S_{PWNM}$ according to the number K of driving phases.

The present inventors have found that the amount of ripple of the output voltage $V_{OUT}$ changes according to a product of the switching frequency and the number K of driving phases. Accordingly, the frequency of the pulse signal $S_{PWM}$ in each number K of driving phases may be determined so as to reduce the ripples of the output voltage $V_{OUT}$ as compared with a case where the frequency of the pulse signal $S_{PWM}$ is constant irrespective of the number K of driving phases. This can maximize the efficiency η by the combination of the number K of driving phases and the amplitude $V_{OUT}$ of the gate driving voltages, and minimize the ripples by the combination of the number K of driving phases and the switching frequency.

Alternatively, when the amount of ripple of the output voltage $V_{OUT}$ does not present a problem, the combination of the number K of driving phases, the switching frequency, and the amplitude $V_{DRV}$ of the gate driving voltages may be determined such that the efficiency η becomes a maximum value. In this case, the operation of the DC/DC converter 2 can be optimized by the combination of the three parameters, and therefore a further increase in efficiency can be achieved.

In the present modification, it can be grasped that the pulse modulator 26, the phase controller 24, and the driving voltage control section 30 of the controller 20 constitute an arithmetic processing section for determining the combination of the number K of driving phases (K is an integer of M or less), the amplitude control signal $S_{CNT}$, and the frequency of the pulse signal $S_{PWM}$ according to the load current $I_{OUT}$ such that the efficiency η of the DC/DC converter 2 approaches a maximum value.

Second Modification

Figure 7:
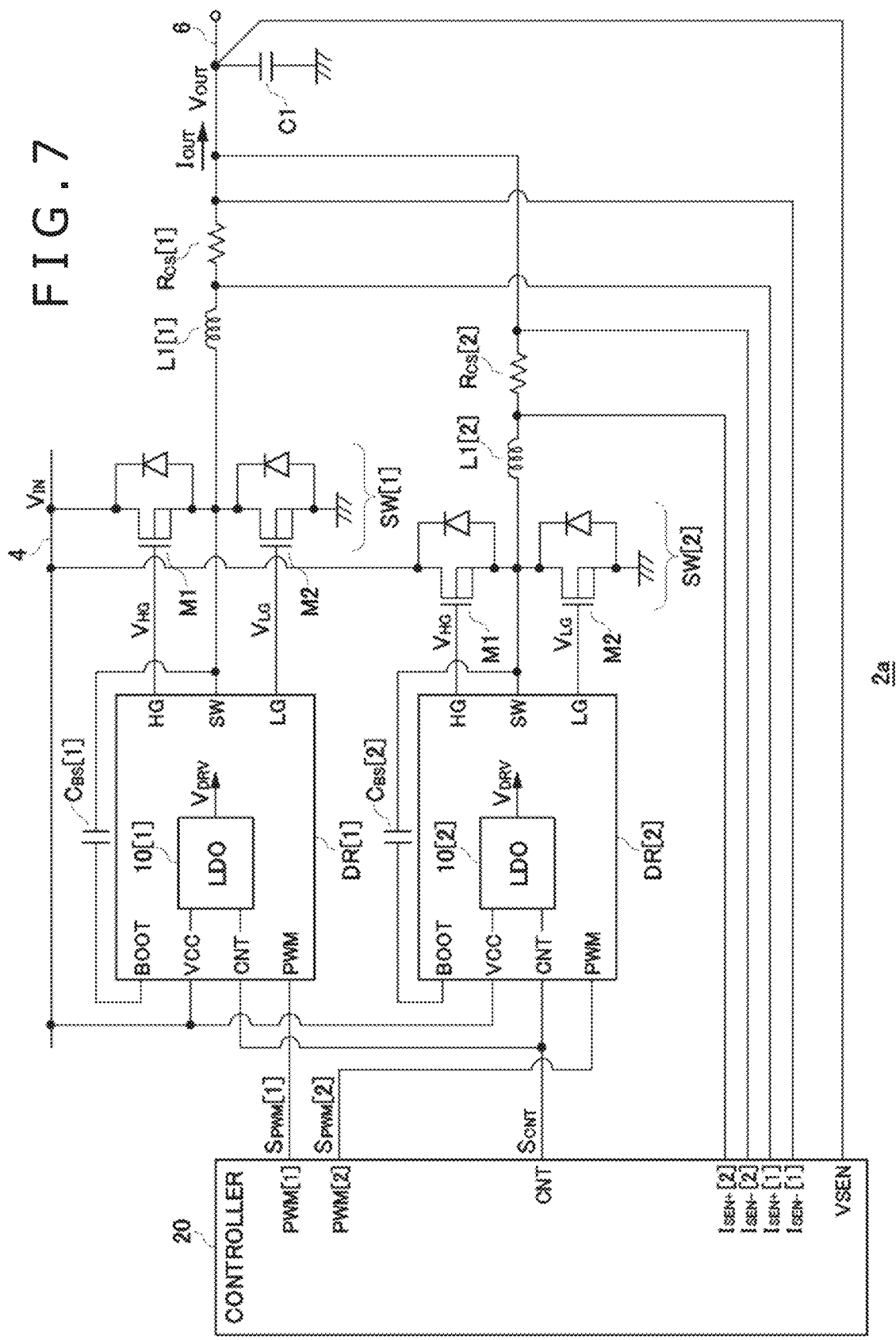
FIG. 7 is a circuit diagram of a DC/DC converter according to a second modification.

FIG. 7 is a circuit diagram of a DC/DC converter 2a according to a second modification. A power supply circuit 10 is provided for each channel. The power supply circuit 10[i] for each channel is included in a chip of a corresponding driver DR[i]. The chip of the driver DR receives an amplitude control signal $S_{CNT}$ from a controller 20. The power supply circuit 10[i] generates an amplitude control voltage $V_{DRV}$ in accordance with the amplitude control signal $S_{CNT}$ from the controller 20. This amplitude control voltage $V_{DRV}$ is supplied to a high-side driver and a low-side driver not shown in the figure.

In the present modification, wiring for routing the amplitude control voltage $V_{DRV}$ on a board on which the step-down DC/DC converter 2 is mounted is not necessary, and therefore a reduction in area can be achieved.

Third Modification

Figure 8:
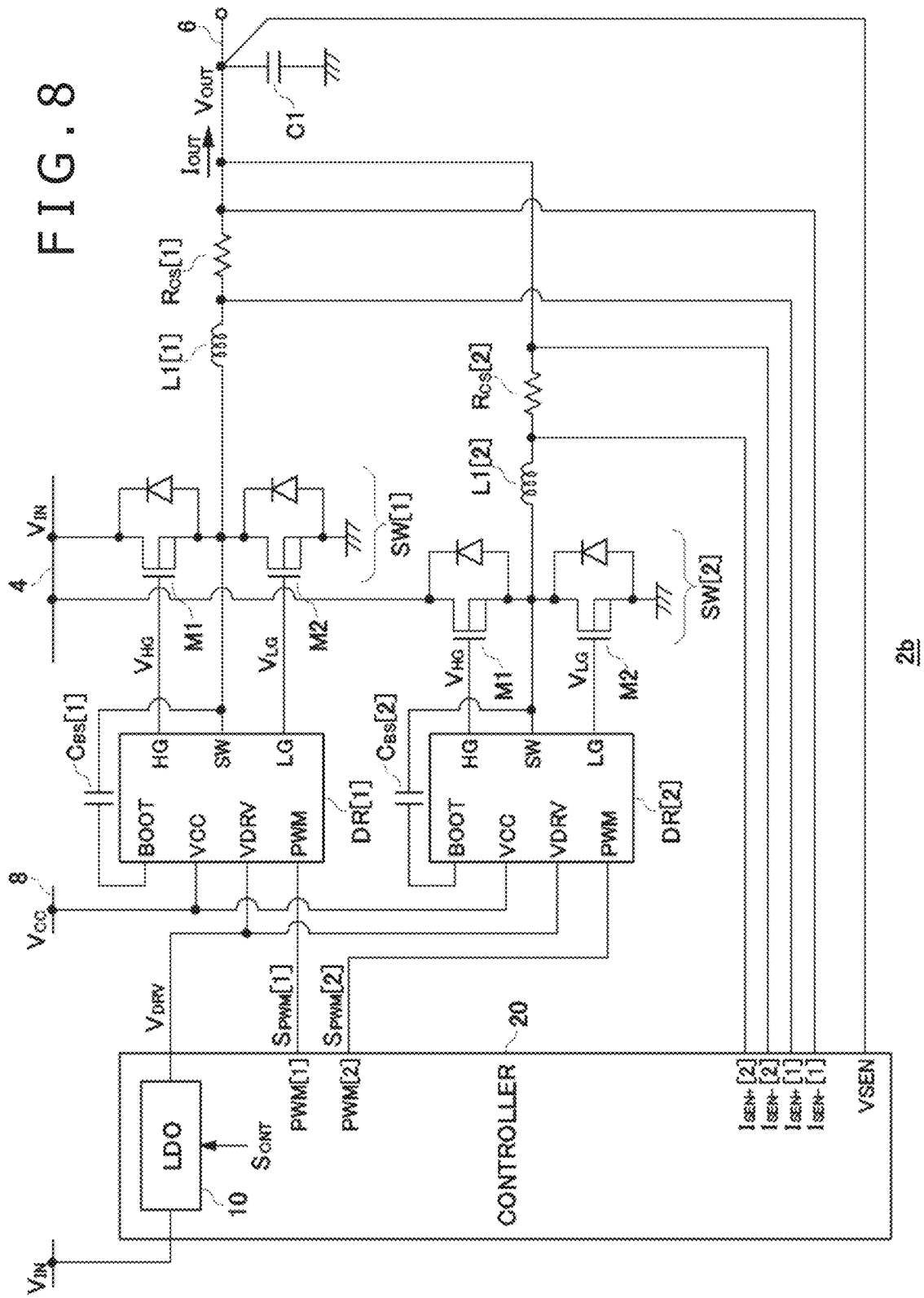
FIG. 8 is a circuit diagram of a DC/DC converter according to a third modification.

FIG. 8 is a circuit diagram of a DC/DC converter 2b according to a third modification. In the present modification, a power supply circuit 10 is included in a chip of a controller.

In this case, wiring for routing an amplitude control signal $S_{CNT}$ on a board on which the step-down DC/DC converter 2 is mounted is not necessary, and therefore a reduction in area can be achieved. In addition, a terminal for outputting the amplitude control signal $S_{CNT}$ from the controller 20 can be omitted. Further, an interface circuit for outputting a digital amplitude control signal $S_{CNT}$ or a D/A converter for outputting an analog amplitude control signal $S_{CNT}$ can be omitted. Therefore the cost and area of the controller 20 can be reduced.

Fourth Modification

The power supply circuit 10 and the M drivers DR[1] to DR[M] may be included in the chip of the controller 20.

In this case, the terminal for outputting the amplitude control signal $S_{CNT}$ from the controller 20 and the accompanying interface circuit or D/A converter can be omitted. Therefore the cost and area of the controller 20 can be reduced. In addition, wiring for routing the amplitude control signal $S_{CNT}$ and the amplitude control voltage $V_{DRV}$ on a board on which the step-down DC/DC converter 2 is mounted is not necessary, and therefore a reduction in area can be achieved.

Fifth Modification

In the embodiment, description has been made of a case where the amplitude of the gate driving voltage $V_{HG}$ for the high side is equal to the amplitude of the gate driving voltage $V_{LG}$ for the low side. However, the present technology is not limited to this. Devices having different characteristics may be used as the switching transistor M1 and the synchronous rectifier transistor M2. In the present modification, the respective amplitudes of the gate driving voltage $V_{HG}$ for the high side and the gate driving voltage $V_{LG}$ for the low side are controlled independently of each other.

Specifically, in the present modification, it is grasped that the amplitude control voltage $V_{DRV}$ described thus far includes a first amplitude control voltage $V_{DRVH}$ and a second amplitude control voltage $V_{DRVL}$, and that the amplitude control signal $S_{CNT}$ includes a first amplitude control signal $S_{CNTH}$ and a second amplitude control signal $S_{CNTL}$.

Figure 9:
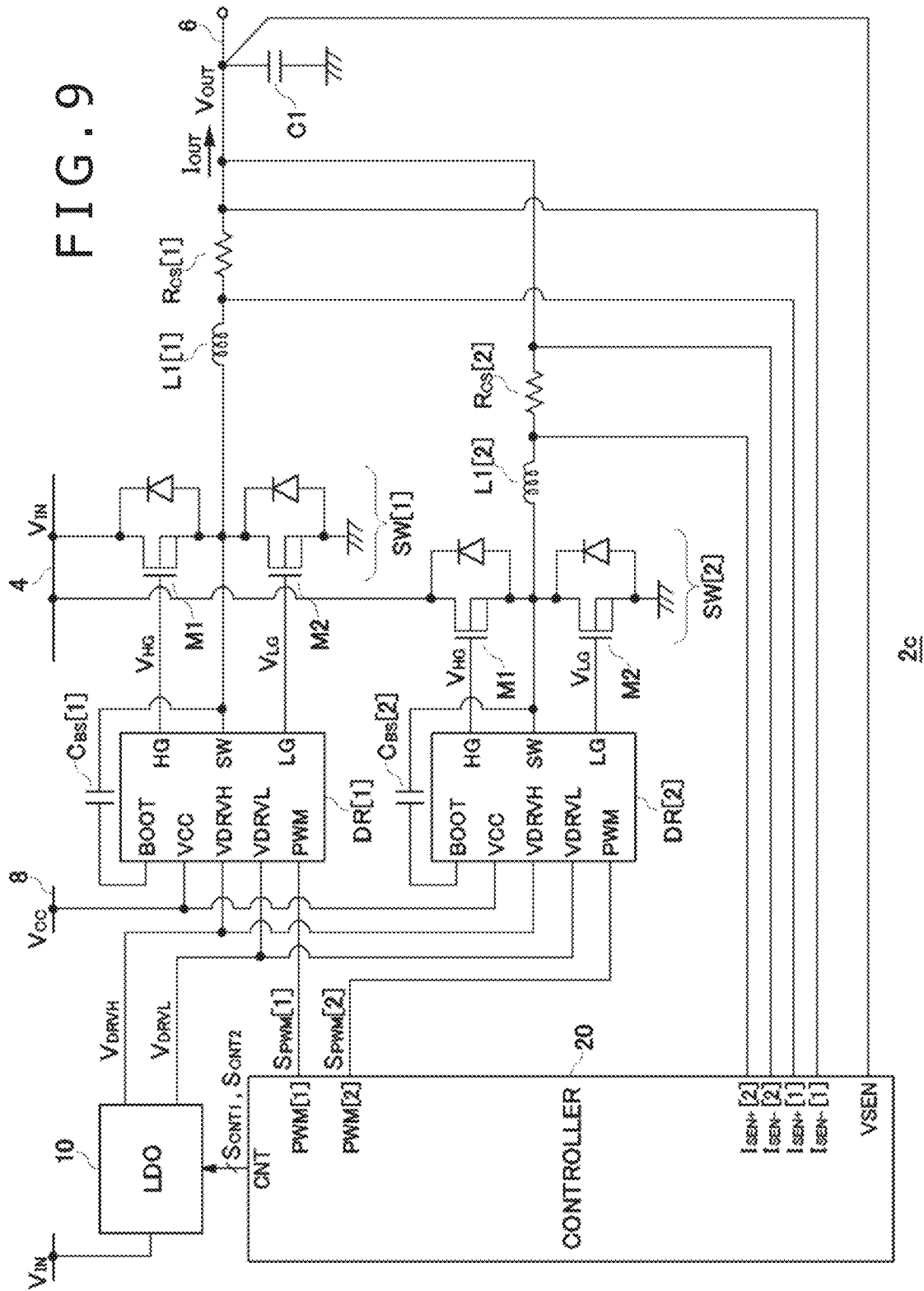
FIG. 9 is a circuit diagram of a DC/DC converter according to a fifth modification.

FIG. 9 is a circuit diagram of a DC/DC converter 2c according to the fifth modification.

A driver DR generates a gate driving voltage $V_{HG}$ for the high side which gate driving voltage $V_{HG}$ has an amplitude in accordance with the first amplitude control voltage $V_{DRVH}$ and a gate driving voltage $V_{LG}$ for the low side which gate driving voltage $V_{LG}$ has an amplitude in accordance with the second amplitude control voltage $V_{DRVL}$. A controller 20 generates the first amplitude control signal $S_{CNTH}$ and the second amplitude control signal $S_{CNTL}$ that independently indicate the respective amplitudes of the gate driving voltage $V_{HG}$ for the high side and the gate driving voltage $V_{LG}$ for the low side on the basis of a calculated load current $I_{OUT}$.

A power supply circuit 10 includes power supplies of two systems. The power supply circuit 10 generates the first amplitude control voltage $V_{DRVH}$ in accordance with the first amplitude control signal $S_{CNTH}$, and generates the second amplitude control voltage $V_{DRVL}$ in accordance with the second amplitude control signal $S_{CNTL}$.

According to the present modification, the gate driving voltages $V_{HG}$ and $V_{LG}$ for the switching transistor M1 and the synchronous rectifier transistor M2 can be optimized independently of each other, so that efficiency can be further increased.

Of course, the embodiment and the few modifications described above can be combined with one another arbitrarily as long as there are no inconsistencies or impeding factors between the embodiment and the few modifications, and these combinations are also included in the scope of the present technology. For example, in the DC/DC converter 2c in FIG. 9, the power supply circuit 10 may be included in the controller 20, or may be included on the side of the driver DR.

Figure 10:
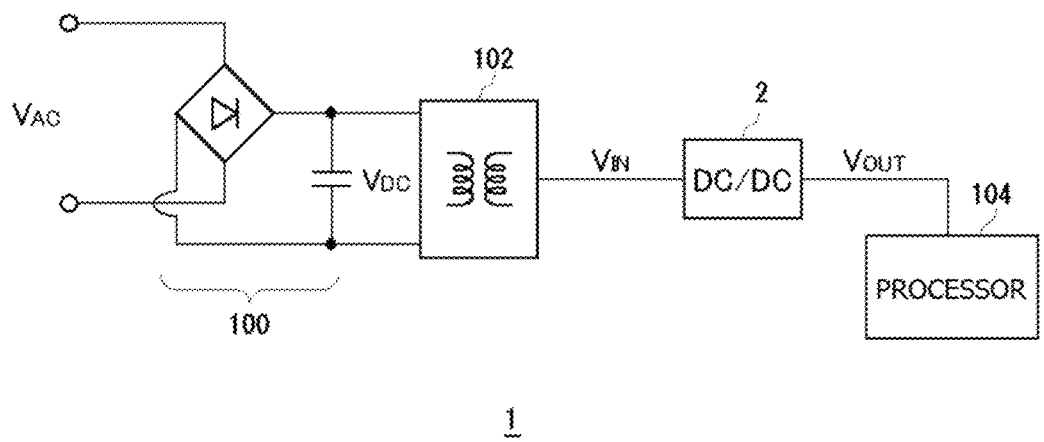
FIG. 10 is a block diagram showing a configuration of an electronic apparatus including the DC/DC converter.

An example of a use of the DC/DC converter 2 will next be described. FIG. 10 is a block diagram showing a configuration of an electronic apparatus 1 including the DC/DC converter 2.

The electronic apparatus 1 is for example a game dedicated machine or a computer. A rectifier circuit 100 rectifies and smoothes a commercial alternating voltage $V_{AC}$, and thereby generates a direct-current voltage $V_{DC}$. An isolated type DC/DC converter 102 steps down the direct-current voltage $V_{DC}$, and thereby generates an input voltage $V_{IN}$. The DC/DC converter 2 steps down the input voltage $V_{IN}$, and supplies an output voltage $V_{OUT}$ to a load, for example the power supply terminal of a processor 104.

Finally, a technology related to the detection of a coil current will be described.

The DC/DC converter is provided with the current detecting resistance $R_{CS}$ for detecting a coil current. A low resistance of about 1 mΩ is used as the current detecting resistance $R_{CS}$ in order to reduce a power loss. Variations in the current detecting resistance $R_{CS}$ result in coil current detection errors. The current detecting resistance $R_{CS}$ is therefore desired to have high accuracy. For such reasons, an external chip part is often used as the current detecting resistance $R_{CS}$. This configuration has a problem of increasing the number of parts and increasing cost. The cost problem is significant especially in a multi-channel DC/DC converter.

Alternatively, a technology is proposed which detects a coil current using a direct-current internal resistance DCR included in an inductor L1. A voltage across the inductor L1 includes a voltage drop of the direct-current internal resistance DCR and an electromotive force occurring in an inductance. Thus, the voltage drop of the direct-current internal resistance DCR is extracted by removing the electromotive force occurring in the inductance from the voltage across the inductor L1. This system can reduce the number of parts, but decreases detection accuracy because estimated values of the inductance and resistance of the inductor L1 are used in removing the counter electromotive force.

In the following, description will be made of a current detecting technology applicable to a DC/DC converter according to an embodiment or an ordinary DC/DC converter, which current detecting technology can be an alternative to the above technologies.

Figure 11:
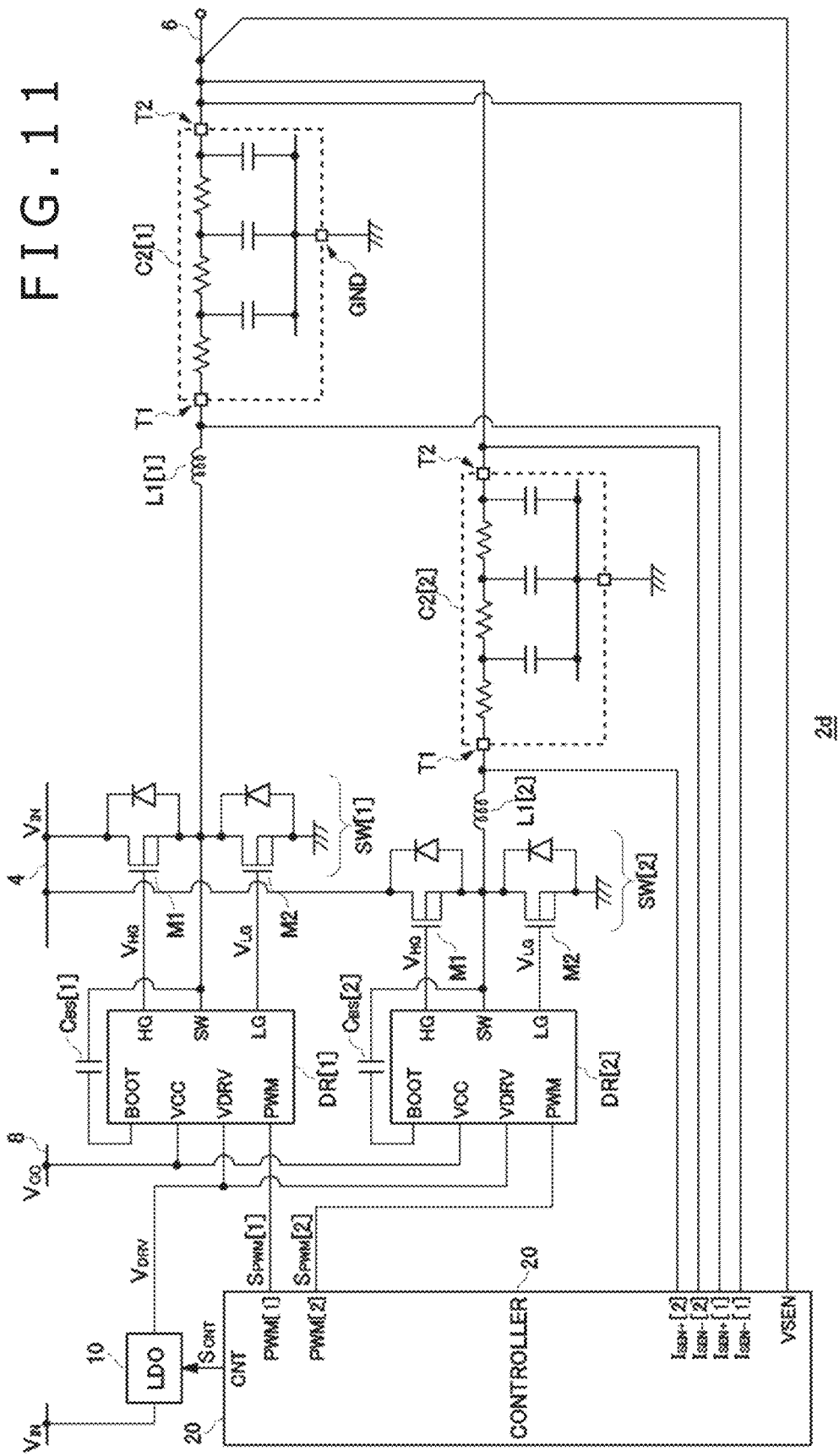
FIG. 11 is a circuit diagram showing a DC/DC converter according to an embodiment.

FIG. 11 is a circuit diagram showing a DC/DC converter 2d according to an embodiment. The DC/DC converter 2d includes feedthrough capacitors C2[1] to C2[M] provided for each channel in place of the current detecting resistance $R_{CS}$. A feedthrough capacitor C2 is referred to also as a transmission-line capacitor or Proadlizer. The capacitance of the feedthrough capacitor C2 is formed by using a transmission line. FIG. 11 shows a three-terminal type feedthrough capacitor. However, a feedthrough capacitor having another structure such as a four-terminal type or the like may be used.

The present inventors have directed attention to facts that the feedthrough capacitor includes a resistance component on a path where a coil current flows, that a direct-current internal resistance DCR and an equivalent series resistance ESR are both on the order of a few hundred μΩ to a few mΩ, and that the resistance component of the feedthrough capacitor is very close to the range of a resistance used as the current detecting resistance $R_{CS}$. It is to be noted that this should not be recognized as technical common knowledge of those skilled in the art.

Accordingly, in the DC/DC converter 2d of FIG. 11, voltages at both terminals T1 and T2 of the feedthrough capacitor C2 are input to current detecting terminals ISEN+ and ISEN− of a controller 20, and the coil current of each channel is detected on the basis of a voltage drop of the feedthrough capacitor C2.

The configuration of the DC/DC converter 2d has been described above.

According to the DC/DC converter 2d, the current detecting resistance $R_{CS}$ is not necessary, and therefore cost and circuit area can be reduced. In addition, because the equivalent direct-current inductance ESL of the feedthrough capacitor C2 is a few hundred pH, the amplitude of the electromotive force occurring in the inductance is sufficiently negligible as compared with the voltage occurring in the resistance component. Thus, as compared with a system using the direct-current resistance component of the inductor L1, the electromotive force removing process is not necessary. Therefore a detection accuracy comparable to that in the case where the current detecting resistance $R_{CS}$ is used can be obtained.

Figure 12B:
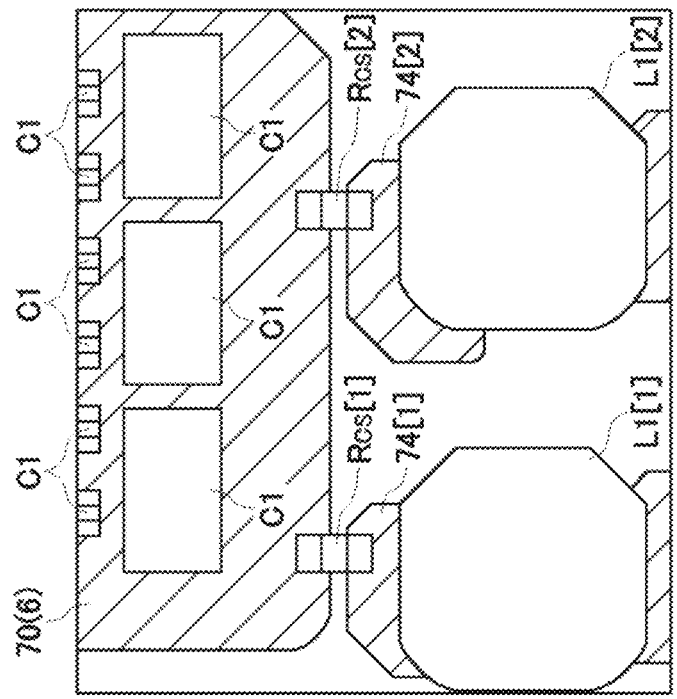
FIG. 12B is a layout diagram of the DC/DC converter using a current detecting resistance $R_{CS}$.
Figure 12A:
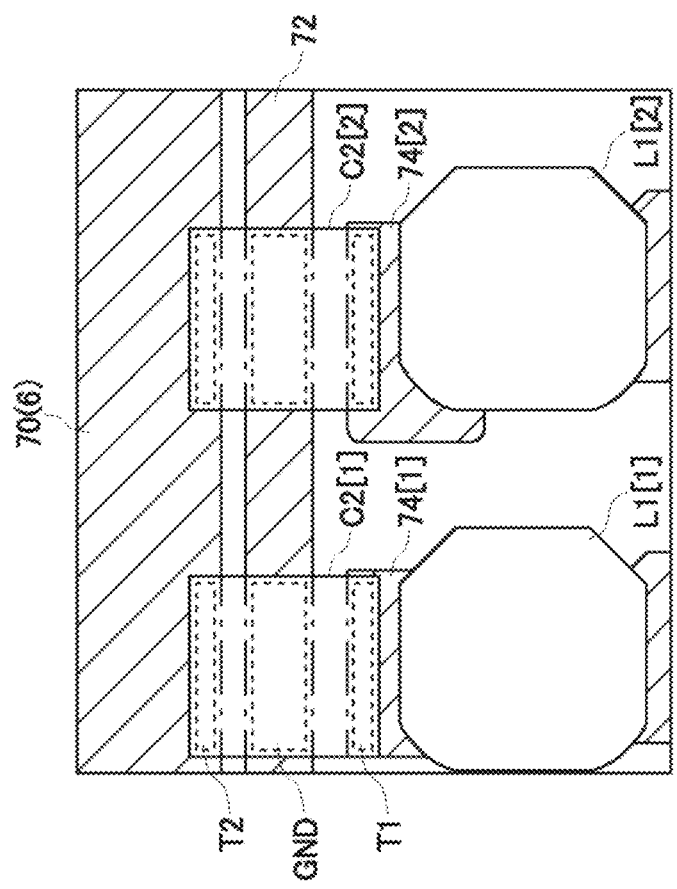
FIG. 12A is a layout diagram of the DC/DC converter of FIG. 11.

FIG. 12A is a layout diagram of the DC/DC converter 2d of FIG. 11. FIG. 12B is a layout diagram of the DC/DC converter 2 using the current detecting resistance $R_{CS}$ for comparison. An output wiring pattern 70 corresponding to the output line 6, a ground region 72, and lands 74[1] and 74[2]

are formed on the front surface of a printed circuit board. One terminal of an inductor L1[1] and a terminal T1 of the feedthrough capacitor C2[1] are electrically and mechanically connected to the land 74[1] by solder. A GND terminal of the feedthrough capacitor C2[1] is connected to the ground region 72 by solder. In addition, a terminal T2 of the feedthrough capacitor C2[1] is connected to the output wiring pattern 70 by solder. The same is true for a second channel.

In FIG. 12B, the output capacitor C1 is formed by a combination of a plurality of electrolytic capacitors and a plurality of laminated ceramic capacitors. The plurality of capacitors each have one terminal connected to an output wiring pattern 70, and each have another terminal connected to a ground region (not shown) formed on the rear surface of a printed circuit board through a via hole (not shown).

As is understood from comparison between FIGS. 12A and 12B, according to the DC/DC converter 2d according to the embodiment, a mounting area on the board can be made equal to or smaller than a mounting area in the case where the current detecting resistance $R_{CS}$ is used.

Figure 13A:
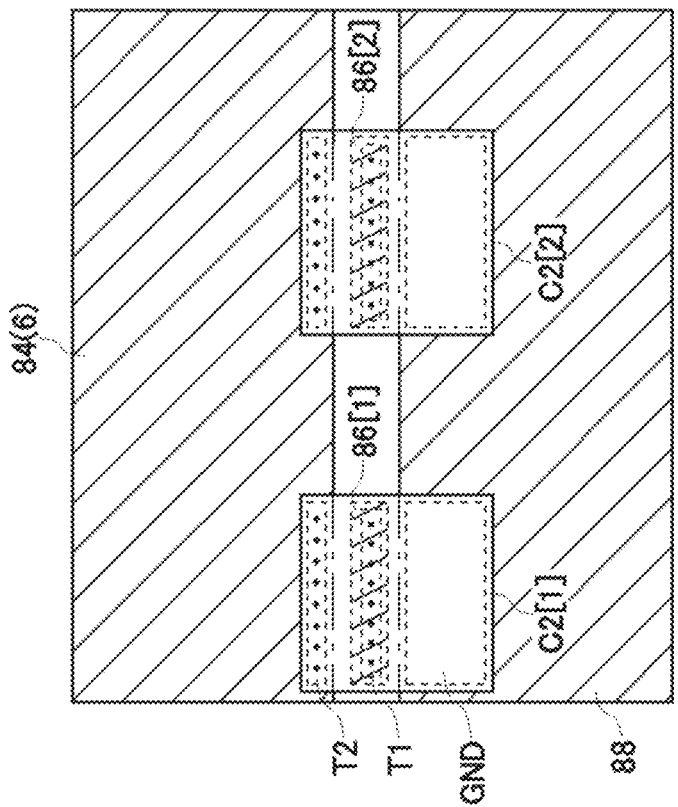
FIGS. 13A and 13B are other layout diagrams of the DC/DC converter of FIG. 11.
Figure 13B:
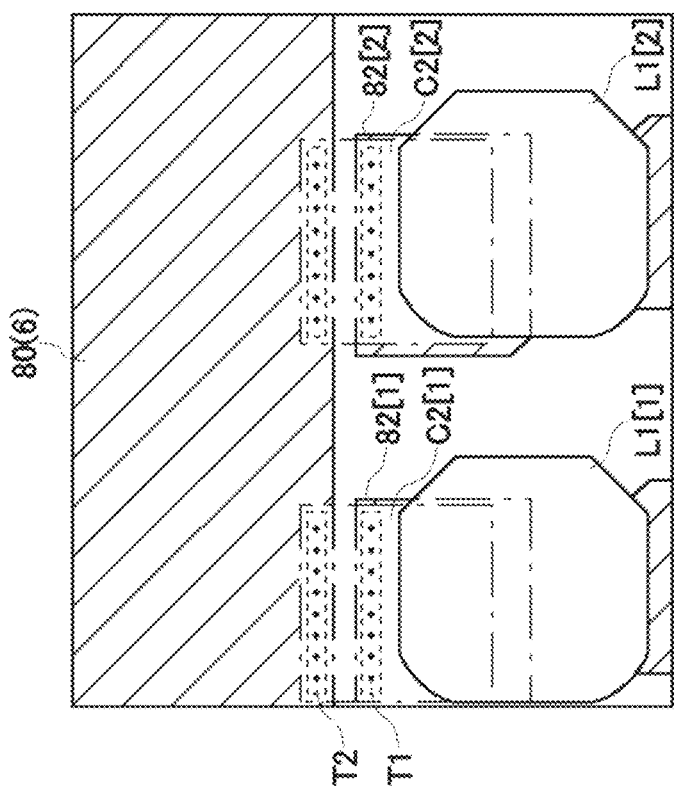

FIGS. 13A and 13B are other layout diagrams of the DC/DC converter 2d of FIG. 11. Note that a pattern on the mounting surface of a feedthrough capacitor C2 used in this case is different from that of FIG. 12A.

FIGS. 13A and 13B respectively show the front surface and rear surface of a printed circuit board on which the DC/DC converter 2d is mounted. As shown in FIG. 13A, a first output wiring pattern 80 corresponding to the output line 6 and lands 82[1] and 82[2] are formed on the front surface of the printed circuit board. Inductors L1[1] and L1[2] are mounted on the front surface. One terminal of the inductor L1[1] is connected to the land 82[1].

As shown in FIG. 13B, a second output wiring pattern 84 corresponding to the output line 6, lands 86[1] and 86[2], and a ground region 88 are formed on the rear surface of the printed circuit board. Feedthrough capacitors C2[1] and C2[2] are mounted on the rear surface. The land 86[1] is connected to the land 82[1] on the front surface through a via hole. A terminal T1, a terminal T2, and a GND terminal of the feedthrough capacitor C2[1] are connected to the land 86[1], the second output wiring pattern 84, and the ground region 88, respectively.

According to this layout, a further reduction in area can be achieved as compared with the layout of FIG. 12A.

The current detecting technology using the feedthrough capacitor is applicable also to a single-channel step-down DC/DC converter. In addition, the step-down DC/DC converter is not limited to a synchronous rectification type, but may be a diode rectification type.

The following technical idea is derived from the DC/DC converter using the feedthrough capacitor.

A step-down DC/DC converter includes: an output line connected with a load; an inductor; a switching transistor connected to the inductor; a feedthrough capacitor provided between the inductor and the output line, the feedthrough capacitor functioning as an output capacitor for smoothing an output voltage; and a controller for detecting a current flowing through the inductor on a basis of a voltage drop across the feedthrough capacitor, and reflecting the detected current in control of the switching transistor.

The present technology has been described above on the basis of embodiments thereof. The embodiments are illustrative, and it is to be understood by those skilled in the art that combinations of constituent elements and processing processes of the embodiments are susceptible of various modifications and that such modifications also fall within the scope of the present technology.

The present application contains subject matter related to that disclosed in Japanese Priority Patent Application JP 2013-139485 filed in the Japan Patent Office on Jul. 3, 2013, the entire content of which is hereby incorporated by reference.

What is claimed is:

1. An M-channel synchronous rectification type step-down direct-current to direct-current converter, M being an integer of at least two, comprising:
   an input line supplied with a direct-current input voltage;
   an output line connected with a load;
   an output capacitor connected to the output line;
   M switching circuits associated with M channels, the M switching circuits each including a switching transistor and a synchronous rectifier transistor provided in series with each other between the input line and a ground line;
   M inductors associated with the M channels, the M inductors each being provided between a switching node of the switching circuit of the corresponding channel and the output line;
   a power supply circuit generating an amplitude control voltage having a voltage level in accordance with an amplitude control signal;
   M drivers associated with the M channels, the M drivers each generating a gate driving voltage for a high side and a gate driving voltage for a low side, the gate driving voltage for the high side and the gate driving voltage for the low side having a duty ratio in accordance with a pulse signal of the corresponding channel and having an amplitude in accordance with the amplitude control voltage, applying the gate driving voltage for the high side to a gate of the switching transistor of the corresponding switching circuit, and applying the gate driving voltage for the low side to a gate of the synchronous rectifier transistor of the corresponding switching circuit; and
   a controller (i) calculating a load current on a basis of currents flowing through the M inductors, (ii) dynamically changing a number K of driving phases, K being an integer of up to M, on a basis of the calculated load current, (iii) generating the pulse signal adjusted in duty ratio such that an output voltage of the output line coincides with a predetermined reference voltage, (iv) selecting K drivers among the M drivers, and distributing the pulse signal with a phase difference of (360/K) degrees to each of the selected K drivers, and (v) monotonically increasing the amplitude control signal with respect to the calculated load current in a range determined in advance for at least one of the number K of driving phases.

2. The step-down direct-current to direct-current converter according to claim 1, wherein the controller decreases a value of the amplitude control signal each time the number K of driving phases is increased.

3. The step-down direct-current to direct-current converter according to claim 1, wherein the controller changes frequency of the pulse signal according to the number K of driving phases.

4. The step-down direct-current to direct-current converter according to claim 3, wherein the frequency of the pulse signal in each number of driving phases is determined so as to reduce ripples of the output voltage as compared with a case where the frequency of the pulse signal is constant irrespective of the number of driving phases.

5. The step-down direct-current to direct-current converter according to claim 1, wherein the power supply circuit is provided for each channel, and the power supply circuit for each channel is included in a chip of the corresponding driver.

6. The step-down direct-current to direct-current converter according to claim 1, wherein the power supply circuit is included in a chip of the controller.

7. The step-down direct-current to direct-current converter according to claim 1, wherein the power supply circuit and the M drivers are included in a chip of the controller.

8. The step-down direct-current to direct-current converter according to claim 1, wherein
the amplitude control voltage includes a first amplitude control voltage and a second amplitude control voltage, and the amplitude control signal includes a first amplitude control signal and a second amplitude control signal,
the M drivers are each configured to generate the gate driving voltage for the high side, the gate driving voltage for the high side having an amplitude in accordance with the first amplitude control voltage, and the gate driving voltage for the low side, the gate driving voltage for the low side having an amplitude in accordance with the second amplitude control voltage,
the controller is configured to generate the first amplitude control signal and the second amplitude control signal independently indicating the respective amplitudes of the gate driving voltage for the high side and the gate driving voltage for the low side on the basis of the calculated load current, and
the power supply circuit is configured to generate the first amplitude control voltage in accordance with the first amplitude control signal and generate the second amplitude control voltage in accordance with the second amplitude control signal.

9. The step-down direct-current to direct-current converter according to claim 1, further comprising:
M feedthrough capacitors, one of the M feedthrough capacitors being provided between each of the M inductors and the output line, and each of the feedthrough capacitors functioning as an output capacitor for smoothing the output voltage,
wherein the controller detects a current flowing through each of the M inductors on a basis of a respective voltage drop across each of the feedthrough capacitors, and reflecting the detected current in control of the switching transistors.

10. An electronic apparatus comprising:
an M-channel synchronous rectification type step-down direct-current to direct-current converter, M being an integer of at least two, including
an input line supplied with a direct-current input voltage,
an output line connected with a load,
an output capacitor connected to the output line,
M switching circuits associated with M channels, the M switching circuits each including a switching transistor and a synchronous rectifier transistor provided in series with each other between the input line and a ground line,
M inductors associated with the M channels, the M inductors each being provided between a switching node of the switching circuit of the corresponding channel and the output line,
a power supply circuit generating an amplitude control voltage having a voltage level in accordance with an amplitude control signal, and
M drivers associated with the M channels, the M drivers each generating a gate driving voltage for a high side and a gate driving voltage for a low side, the gate driving voltage for the high side and the gate driving voltage for the low side having a duty ratio in accordance with a pulse signal of the corresponding channel and having an amplitude in accordance with the amplitude control voltage, applying the gate driving voltage for the high side to a gate of the switching transistor of the corresponding switching circuit, and applying the gate driving voltage for the low side to a gate of the synchronous rectifier transistor of the corresponding switching circuit, and
a controller (i) calculating a load current on a basis of currents flowing through the M inductors, (ii) dynamically changing a number K of driving phases, K being an integer of up to M, on a basis of the calculated load current, (iii) generating the pulse signal adjusted in duty ratio such that an output voltage of the output line coincides with a predetermined reference voltage, (iv) selecting K drivers among the M drivers, and distributing the pulse signal with a phase difference of (360/K) degrees to each of the selected K drivers, and (v) monotonically increasing the amplitude control signal with respect to the calculated load current in a range determined in advance for at least one of the number K of driving phases.

11. A controller used in an M-channel synchronous rectification type step-down direct-current to direct-current converter, M being an integer of at least two,
the step-down direct-current to direct-current converter including, in addition to the controller,
an input line supplied with a direct-current input voltage,
an output line connected with a load,
an output capacitor connected to the output line,
M switching circuits associated with M channels, the M switching circuits each including a switching transistor and a synchronous rectifier transistor provided in series with each other between the input line and a ground line,
M inductors associated with the M channels, the M inductors each being provided between a switching node of the switching circuit of the corresponding channel and the output line,
a power supply circuit generating an amplitude control voltage having a voltage level in accordance with an amplitude control signal, and
M drivers associated with the M channels, the M drivers each generating a gate driving voltage for a high side and a gate driving voltage for a low side, the gate driving voltage for the high side and the gate driving voltage for the low side having a duty ratio in accordance with a pulse signal of the corresponding channel and having an amplitude in accordance with the amplitude control voltage, applying the gate driving voltage for the high side to a gate of the switching transistor of the corresponding switching circuit, and applying the gate driving voltage for the low side to a gate of the synchronous rectifier transistor of the corresponding switching circuit,
the controller comprising:
a current detecting section calculating a load current on a basis of currents flowing through the M inductors;
a phase controller dynamically changing a number K of driving phases on a basis of the calculated load current, K being an integer of up to M;
a pulse modulator generating the pulse signal adjusted in duty ratio such that an output voltage of the output line coincides with a predetermined reference voltage;

a pulse distributing section selecting K drivers among the M drivers, and distributing the pulse signal with a phase difference of (360/K) degrees to each of the selected K drivers; and a driving voltage control section monotonically increasing the amplitude control signal with respect to the calculated load current in a range determined in advance for each at least one of the number K of driving phases;

the controller being formed as one package.

12. The controller according to claim 11, wherein the driving voltage control section decreases a value of the amplitude control signal each time the number K of driving phases is increased.

13. The controller according to claim 11, wherein the pulse modulator changes frequency of the pulse signal according to the number K of driving phases.

14. The controller according to claim 11, wherein the power supply circuit is included in the controller.

15. A controller used in an M-channel synchronous rectification type step-down direct-current to direct-current converter, M being an integer of at least two, the direct-current to direct-current converter including, in addition to the controller, an input line supplied with a direct-current input voltage, an output line connected with a load, an output capacitor connected to the output line, M switching circuits associated with M channels, the M switching circuits each including a switching transistor and a synchronous rectifier transistor provided in series with each other between the input line and a ground line, M inductors associated with the M channels, the M inductors each being provided between a switching node of the switching circuit of the corresponding channel and the output line, a power supply circuit generating an amplitude control voltage having a voltage level in accordance with an amplitude control signal, and M drivers associated with the M channels, the M drivers each generating a gate driving voltage for a high side and a gate driving voltage for a low side, the gate driving voltage for the high side and the gate driving voltage for the low side having a duty ratio in accordance with a pulse signal of the corresponding channel and having an amplitude in accordance with the amplitude control voltage, applying the gate driving voltage for the high side to a gate of the switching transistor of the corresponding switching circuit, and applying the gate driving voltage for the low side to a gate of the synchronous rectifier transistor of the corresponding switching circuit, the controller comprising:

a current detecting section calculating a load current on a basis of currents flowing through the M inductors;

a pulse modulator generating the pulse signal adjusted in duty ratio such that an output voltage of the output line coincides with a predetermined reference voltage;

an arithmetic processing section determining a combination of a number K of driving phases, K being an integer of up to M, the amplitude control signal, and frequency of the pulse signal according to the load current; and a pulse distributing section selecting K drivers among the M drivers, and distributing the pulse signal with a phase difference of (360/K) degrees to each of the selected K drivers;

the controller being formed as one package.

16. The controller according to claim 15, wherein the power supply circuit is included in the controller.

17. A control method of an M-channel synchronous rectification type step-down direct-current to direct-current converter, M being an integer of at least two, the step-down direct-current to direct-current converter including an input line supplied with a direct-current input voltage, an output line connected with a load, an output capacitor connected to the output line, M switching circuits associated with M channels, the M switching circuits each including a switching transistor and a synchronous rectifier transistor provided in series with each other between the input line and a ground line, M inductors associated with the M channels, the M inductors each being provided between a switching node of the switching circuit of the corresponding channel and the output line, a power supply circuit generating an amplitude control voltage having a voltage level in accordance with an amplitude control signal, and M drivers associated with the M channels, the M drivers each generating a gate driving voltage for a high side and a gate driving voltage for a low side, the gate driving voltage for the high side and the gate driving voltage for the low side having a duty ratio in accordance with a pulse signal of the corresponding channel and having an amplitude in accordance with the amplitude control voltage, applying the gate driving voltage for the high side to a gate of the switching transistor of the corresponding switching circuit, and applying the gate driving voltage for the low side to a gate of the synchronous rectifier transistor of the corresponding switching circuit, the control method comprising:

calculating a load current on a basis of currents flowing through the M inductors;

dynamically changing a number K of driving phases, K being an integer of up to M, on a basis of the calculated load current;

generating the pulse signal adjusted in duty ratio such that an output voltage of the output line coincides with a predetermined reference voltage;

selecting K drivers among the M drivers, and distributing the pulse signal with a phase difference of (360/K) degrees to each of the selected K drivers; and generating the amplitude control signal on the basis of the calculated load current, and monotonically increasing the amplitude control signal with respect to the calculated load current in a range determined in advance for at least one of the number K of driving phases.

* * * * *